US011585549B1

(12) United States Patent
Frader-Thompson et al.

(10) Patent No.: US 11,585,549 B1
(45) Date of Patent: Feb. 21, 2023

(54) THERMAL MODELING TECHNOLOGY

(71) Applicant: EnergyHub, Inc., Brooklyn, NY (US)

(72) Inventors: Seth Frader-Thompson, Brooklyn, NY (US); Benjamin Hertz-Shargel, Roslyn Estates, NY (US); Michael DeBenedittis, Brooklyn, NY (US)

(73) Assignee: EnergyHub, Inc., Brooklyn, NY (US)

( * ) Notice: Subject to any disclaimer, the term of this patent is extended or adjusted under 35 U.S.C. 154(b) by 0 days.

(21) Appl. No.: 16/994,947

(22) Filed: Aug. 17, 2020

Related U.S. Application Data

(63) Continuation of application No. 15/453,127, filed on Mar. 8, 2017, now Pat. No. 10,746,425.

(51) Int. Cl.
*G06F 119/08* (2020.01)
*F24F 11/30* (2018.01)
(Continued)

(52) U.S. Cl.
CPC .............. *F24F 11/30* (2018.01); *F24F 11/62* (2018.01); *G05B 17/02* (2013.01); *F24F 11/46* (2018.01); *F24F 11/52* (2018.01); *F24F 11/58* (2018.01); *F24F 11/63* (2018.01); *F24F 11/64* (2018.01); *F24F 2110/10* (2018.01);
(Continued)

(58) Field of Classification Search
CPC .. F24F 11/30; F24F 11/62; F24F 11/63; F24F 11/64; F24F 2130/00; F24F 2130/10; F24F 11/46; F24F 2110/10; F24F 11/52; F24F 11/58; G05B 17/02; G06F 2119/00; H02J 3/003; H02J 2310/14; Y04S 20/242; Y04S 40/20
See application file for complete search history.

(56) References Cited

U.S. PATENT DOCUMENTS 6,785,592 B1 8/2004 Smith et al.
7,908,116 B2 3/2011 Steinberg
(Continued)

FOREIGN PATENT DOCUMENTS

WO  WO 2008/003033  1/2008

OTHER PUBLICATIONS

Chen et al, "Demand Response-Enabled Residential Thermostat Controls," ACEEE, 2008, 1-24-1-36.
(Continued)

*Primary Examiner* — Kibrom K Gebresilassie
(74) *Attorney, Agent, or Firm* — Fish & Richardson P.C.

(57) ABSTRACT

Methods, systems, and apparatus, including computer programs encoded on a computer storage medium, for performing thermal modeling. In one aspect, a method includes receiving monitoring data comprising temperature data measured inside a site, mode data, and state data, receiving weather data descriptive of weather at the site, and aligning the received temperature data, mode data, and state data with the received weather data. The method also includes determining an internal heat gain representing an amount of heat generated at the site irrespective of the heating or cooling system, determining at least one of a thermal product for the site or a thermal potential for the heating or cooling system, generating, based on the internal gain and the thermal product or the thermal potential, a thermal model for the site, and providing, as output, the generated thermal model.

23 Claims, 20 Drawing Sheets

(51) Int. Cl.
  *G05B 17/02* (2006.01)
  *F24F 11/62* (2018.01)
  *F24F 11/63* (2018.01)
  *F24F 11/52* (2018.01)
  *F24F 11/64* (2018.01)
  *F24F 11/58* (2018.01)
  *F24F 110/10* (2018.01)
  *F24F 130/10* (2018.01)
  *F24F 11/46* (2018.01)
  *F24F 130/00* (2018.01)
  *H02J 3/00* (2006.01)

(52) U.S. Cl.
  CPC ....... *F24F 2130/00* (2018.01); *F24F 2130/10* (2018.01); *G06F 2119/08* (2020.01); *H02J 3/003* (2020.01); *H02J 2310/14* (2020.01); *Y04S 20/242* (2013.01); *Y04S 40/20* (2013.01)

(56) References Cited

U.S. PATENT DOCUMENTS

| | | | |
|---|---|---|---|
| 8,386,087 B2 | 2/2013 | Spicer | |
| 9,765,984 B2 | 9/2017 | Smith et al. | |
| 9,807,099 B2* | 10/2017 | Matsuoka | G06F 16/955 |
| 10,241,528 B1 | 3/2019 | Frader-Thompson et al. | |
| 10,592,622 B1 | 3/2020 | Csank et al. | |
| 10,746,425 B1* | 8/2020 | Frader-Thompson | F24F 11/62 |
| 10,770,897 B1 | 9/2020 | Hertz-Shargel et al. | |
| 11,073,849 B1 | 7/2021 | Frader-Thompson et al. | |
| 2005/0047043 A1 | 3/2005 | Schweitzer et al. | |
| 2008/0120068 A1 | 5/2008 | Martin et al. | |
| 2008/0120069 A1 | 5/2008 | Martin et al. | |
| 2010/0114799 A1 | 5/2010 | Black et al. | |
| 2010/0211224 A1 | 8/2010 | Keeling et al. | |
| 2011/0046806 A1* | 2/2011 | Nagel | H04L 67/125 700/291 |
| 2011/0106328 A1 | 5/2011 | Zhou et al. | |
| 2011/0231320 A1 | 9/2011 | Irving | |
| 2012/0053746 A1 | 3/2012 | Drake et al. | |
| 2012/0084063 A1 | 4/2012 | Drees et al. | |
| 2012/0136496 A1 | 5/2012 | Black | |
| 2012/0232701 A1 | 9/2012 | Carty et al. | |
| 2012/0323374 A1 | 12/2012 | Dean-Hendricks et al. | |
| 2013/0024141 A1 | 1/2013 | Marwah et al. | |
| 2013/0090777 A1 | 4/2013 | Lu et al. | |
| 2013/0090791 A1* | 4/2013 | Yeh | F02D 41/14 701/22 |
| 2013/0144451 A1 | 6/2013 | Kumar | |
| 2013/0212410 A1 | 8/2013 | Li et al. | |
| 2013/0231792 A1 | 9/2013 | Ji et al. | |
| 2014/0277761 A1 | 9/2014 | Matsuoka | |
| 2014/0277769 A1* | 9/2014 | Matsuoka | F24F 11/00 700/278 |
| 2014/0330442 A1 | 11/2014 | Obara et al. | |
| 2014/0339316 A1 | 11/2014 | Barooah et al. | |
| 2015/0149135 A1 | 5/2015 | Tervo | |
| 2015/0220069 A1 | 8/2015 | Linehan et al. | |
| 2015/0248118 A1 | 9/2015 | Li | |
| 2015/0316282 A1 | 11/2015 | Stone et al. | |
| 2016/0077538 A1 | 3/2016 | Berka et al. | |
| 2016/0109147 A1 | 4/2016 | Uno et al. | |
| 2016/0117199 A1* | 4/2016 | Sundaram | G06F 9/5094 718/104 |
| 2016/0234972 A1 | 8/2016 | Billet et al. | |
| 2016/0291561 A1 | 10/2016 | Al-Mohssen et al. | |
| 2016/0292205 A1 | 10/2016 | Massey et al. | |
| 2016/0305678 A1* | 10/2016 | Pavlovski | G05B 15/02 |
| 2016/0378894 A1 | 12/2016 | Yoon | |
| 2017/0003043 A1 | 1/2017 | Thiebaux et al. | |
| 2017/0167742 A1 | 6/2017 | Radovanovic et al. | |
| 2017/0206615 A1 | 7/2017 | Sloop et al. | |
| 2017/0288401 A1 | 10/2017 | Hunnnnon et al. | |
| 2017/0364043 A1 | 12/2017 | Ganti et al. | |
| 2018/0051900 A1* | 2/2018 | Van Goor | F24F 11/62 |
| 2018/0191197 A1* | 7/2018 | Carr | H02J 13/00 |
| 2018/0219374 A1* | 8/2018 | Pavlak | G05B 13/045 |
| 2018/0245809 A1 | 8/2018 | Endel et al. | |
| 2019/0266780 A1 | 8/2019 | Floch | |
| 2019/0362529 A1 | 11/2019 | Wedig et al. | |
| 2020/0076193 A1* | 3/2020 | Biris | H02J 3/381 |
| 2020/0090045 A1 | 3/2020 | Baker | |
| 2020/0293876 A1 | 9/2020 | Phan et al. | |
| 2021/0241117 A1 | 8/2021 | Wang et al. | |
| 2021/0367424 A1 | 11/2021 | Diao et al. | |
| 2022/0094172 A1 | 3/2022 | Hertz-Shargel | |

OTHER PUBLICATIONS

Honeywell, "Honeywell Wi-Fi Thermostats Allow Homeowners to Connect With Utilities And Turn Up The Savings," Honeywell, Oct. 2013, 1-3.
Notice of Allowance in U.S. Appl. No. 15/366,212, dated Dec. 19, 2018, 7 pages.
Office Action in U.S. Appl. No. 15/366,212, dated Jun. 13, 2018, 13 pages.
Office Action in U.S. Appl. No. 15/785,533, dated Aug. 21, 2019, 17 pages.
Office Action in U.S. Appl. No. 16/363,498, dated Jun. 22, 2020, 11 pages.
Para, "Nest Thermostats: The Future of Demand Response Programs?," Powermag, Jul. 2014, 6 pages.
Yoav, "What is Demand Response?," Simple Energy, Jun. 2015, 1-6.
Office Action in U.S. Appl. No. 16/363,498, dated Nov. 20, 2020, 15 pages.
PCT International Search Report and Written Opinion in International Appln. No. PCT/US2021/049097, dated Nov. 26, 2021, 13 pages.

* cited by examiner

THERMAL MODELING TECHNOLOGY

CROSS-REFERENCE TO RELATED APPLICATIONS

The application is a continuation of U.S. application Ser. No. 15/453,127, filed Mar. 8, 2017, now allowed, which incorporates by reference U.S. patent application Ser. No. 15/366,212 filed on Dec. 1, 2016, which claims the benefit of U.S. Provisional Application No. 62/261,787 filed on Dec. 1, 2015.

FIELD

The present specification relates to generating thermal models.

BACKGROUND

Thermal models can be generated for sites to predict characteristics of the sites under various predetermined conditions and/or hypothetical conditions. The thermal models may be generated according to historical internal temperature and weather data, as well as forecast internal temperature and weather data. By predicting characteristics of the site, thermal models may be used to represent characteristics of the sites according to predetermined conditions such as forecast internal temperatures, setpoint temperatures and weather at the sites.

SUMMARY

In some aspects, thermal modeling technology includes generating thermal models for sites to simulate characteristics of the sites under predetermined temperature and weather conditions. The thermal models can be generated over time, using temperature data inside the sites, such as indoor temperature and setpoint temperatures, as well as weather data external to the sites. The temperature and weather data at the sites may be used to characterize the sites. The sites may be modeled under arbitrary conditions such as arbitrary setpoint timeseries, weather timeseries, initial conditions of indoor temperature, and the mode and state of heating or cooling systems located at the sites, using the temperature and weather data. For example, the temperature and weather data can be aligned to quantify how a particular site reacts under predetermined temperature and weather conditions. In this instance, a thermal model can be generated for the particular site to simulate heat flow at the site. In certain aspects, the simulated heat flow may be used to determine energy consumption of the site under various conditions. The thermal model of the particular site may be used in conjunction with thermal models generated for other sites to determine an optimal control strategy of energy consumption for the sites as whole.

In certain examples, the thermal modeling technology can include the generation of thermal models by a thermal modeling server. The thermal modeling server can be connected to a weather server and a plurality of sites. The thermal modeling server can be configured to receive weather data from the weather server indicating past and present weather proximate to the plurality of sites. The weather proximate to the plurality of sites may include multiple weather data sets, each of the data sets being proximate to an individual site. The plurality of sites can each include a monitoring system that collects data such as monitoring data of the sites. The weather data and the monitoring data can be used by the thermal modeling server to determine characteristics of each of the sites. For example, the thermal modeling server may determine an internal heat gain, a thermal product, and/or a thermal potential corresponding to each site. The thermal modeling server may use any combination of the internal heat gain, the thermal product, and the thermal potential for each site to generate thermal models for the sites. The thermal models may be provided for output and used to effectively simulate and forecast heat flow at the sites under varying conditions.

One innovative aspect of the subject matter described in this specification is embodied in methods that include the actions of receiving, over time, monitoring data collected by a monitoring system that includes a control unit configured to control a heating or cooling system located at a site, the monitoring data comprising temperature data measured inside the site, mode data, and state data, receiving weather data descriptive of weather at a location of the site, aligning, over time intervals, the received temperature data, mode data, and state data with the received weather data, determining, based on the aligned data, an internal heat gain for the site, the internal heat gain representing an amount of heat generated at the site irrespective of the heating or cooling system, determining at least one of a thermal product for the site or a thermal potential for the heating or cooling system, generating, based on the internal heat gain and at least one of the thermal product or the thermal potential, a thermal model for the site and providing, as output, the generated thermal model.

Other implementations of this and other aspects include corresponding systems, apparatus, and computer programs, configured to perform the actions of the methods, encoded on computer storage devices.

Implementations may each optionally include one or more of the following features. For instance, the methods can include determining, based on the received temperature data, mode data, and state data, a thermal product for the site, the thermal product representing a product of a thermal capacitance and a thermal resistance of the site, and determining based on the aligned data and the thermal product, a thermal potential for the heating or cooling system, and generating the thermal model based on the internal heat gain, the thermal product, and the thermal potential. The methods can also include determining, based on the received temperature data, mode data, and state data, a thermal product for the site, the thermal product representing a product of a thermal capacitance and a thermal resistance of the site, and generating the thermal model based on the internal heat gain and the thermal product. In some aspects, generating the thermal model for the site includes generating one or more thermal models for the site, the one or more thermal models including at least one of a simple thermal model and a hybrid thermal model.

Further, the methods can include determining, based on the aligned data and a thermal product for the site, a thermal potential for the heating or cooling system, and generating the thermal model based on the internal heat gain and the thermal potential. The methods can also include determining, based on the aligned data, an efficiency directed to the site, and generating the thermal model based on the efficiency directed to the site. In some aspects, the monitoring system can include a connected thermostat located at the site and the methods can include receiving, over time and from the connected thermostat, the temperature data, the mode data, and the state data. The methods can include determining a steady state model for the site, and generating the thermal model based on the steady state model for the site.

In certain aspects, the methods can include receiving updated temperature data measured inside the site, receiving updated weather data descriptive of weather at the location of the site, aligning, over time intervals, the updated weather data with the updated temperature data, and updating, based on the aligned updated data, the generated thermal model. In this instance, the methods can include analyzing the aligned updated data against one or more of the generated thermals models and previously aligned site and weather data, and updating, based on the analysis the generated thermal model for the site. The methods can further include receiving the monitoring data from the monitoring system that includes the control unit configured to control the heating or cooling system located at the site. The methods can include receiving the monitoring data from a server that communicates with the monitoring system that includes the control unit configured to control the heating or cooling system located at the site. In certain aspects, determining the internal heat gain for the site includes determining a model of a dynamic, physical quantity that is parameterized by time for the site.

The methods can also include accessing the generated thermal model, analyzing the generated thermal model, and performing, based on the analysis, an action related to the site. In this instance, performing the action related to the site can include performing one or more of providing the generated thermal model as output to a graphical display, providing a recommendation of an adjustment to a schedule of the control unit, automatically adjusting the schedule of the control unit, providing a recommendation of an adjustment to the state of the heating or cooling system, performing an action at the site, and providing runtime and cost forecasting for the heating or cooling system in light of forecasted weather and settings for the control unit. In certain aspects, performing an action at the site can include providing a recommendation of an adjustment to a characteristic of the site, providing a recommendation of contacting a technician for maintenance systems/units of the site, providing a recommendation of contacting a technician for repair of the systems/units of the site, providing a recommendation of contacting a technician for replacement of the systems/units of the site, and the like.

In certain aspects, the methods can include determining, based on the aligned data, an efficiency directed to the site, determining whether the efficiency satisfies a predetermined efficiency rule, and in response to determining that the efficiency rule is not satisfied, performing an action. In this instance, performing the action can correspond to one or more of providing a recommendation that improves an energy efficiency of the site, providing the generated thermal model as output to a graphical display, providing a recommendation of an adjustment to a schedule of the control unit, automatically adjusting the schedule of the control unit, providing a recommendation of an adjustment to the state of the heating or cooling system, performing an action at the site, providing runtime and cost forecasting for the heating or cooling system in light of forecasted weather and settings for the control unit, providing a recommendation of an adjustment to a characteristic of the site, providing a recommendation of contacting a technician for maintenance systems/units of the site, providing a recommendation of contacting a technician for repair of the systems/units of the site, providing a recommendation of contacting a technician for replacement of the systems/units of the site, and the like. In some examples, determining the efficiency directed to the site includes determining one or more of a heating or cooling system efficiency for the site, a thermal product efficiency for the site, and an internal heat gain efficiency for the site.

The methods can further include accessing characteristics associated with each of multiple sites, identifying, based on the accessed characteristics, one or more subsets of the multiple sites that have similar characteristics, grouping the multiple sites into the one or more subsets of the multiple sites that have similar characteristics, accessing thermal models corresponding to sites grouped in a particular subset of the one or more subsets, and generating, based on the accessed thermal models, a representative thermal model for the particular subset of sites. In this instance, the methods can also include identifying a new site for which a thermal model has not been generated, in response to identifying the new site for which a thermal model has not been generated, determining characteristics associated with the new site, determining, based on the determined characteristics of the new site, that the new site has characteristics similar to sites in the particular subset, and selecting, based on the determination that the new site has characteristics similar to sites in the particular subset, the representative thermal model to use for the identified site. Additionally, the methods can include analyzing the representative thermal model that has been selected for the new site, and performing, based on the analysis of the representative thermal model, an action related to the new site.

The methods can include determining, based on the aligned data, a deadband of the control unit, the deadband including, for a set temperature, an upper temperature threshold above the set temperature and a lower temperature threshold below the set temperature between which the control unit cycle in controlling the heating or cooling system to meet the set temperature. Further, the methods can include determining, based on the thermal model, an amount of power consumed by the heating or cooling system. The methods can also include determining heat generation characteristics of the site over a predetermined period of time, the heat generation characteristics being distinct from the heating or cooling system. Additionally, the methods can include analyzing the internal heat gain for the site, identifying, based on the analysis, periods of time during which the internal heat gain for the site is greater than a predetermined internal heat gain threshold, and controlling the control unit to perform one or more actions to address the internal heat gain during the identified periods of time.

Advantageous implementations can include one or more of the following features. Thermal modeling technology can include methods that generate thermal models for sites to characterize heat flow at the sites. The sites may be characterized using only monitoring data inside the sites as well as weather data proximate to the sites. The monitoring and weather data can be used to determine modeling parameters for the sites without using power readings of the sites. In this instance, the sites may be modeled through learned and estimated parameters for each of the sites. For example, one determined parameter can be internal heat gain at the sites. The internal heat gain can be attributed to heat generation characteristics within the sites that are distinct from heating or cooling systems located at the sites. The internal heat gain may be modeled as a function of time and used in the generation of thermal models for the sites. In another example, a determined parameter can be a thermal product for each of the sites. The thermal product can be used to characterize physical quantities of the sites, for use in the generation of the thermal models. The thermal product of a site can represent a product of physical quantities such as the thermal capacitance and the thermal resistance at the site. Specifically, the thermal product may refer to a characteristic time scale of heat transfer at a particular site. In another example, a determined parameter can include a thermal potential for the site. The thermal potential can correspond to a thermal potential for a heating or cooling system located at the site. The thermal potential may represent a removal of heat inside the site by the heating or cooling system, such as the increase or respective decrease in the rate of overall heat gain within the site when the heating or cooling system is on, in comparison to when the heating or cooling system is off. Thermal modeling technology can use monitoring and weather readings at the sites to determine heat flow of the sites under arbitrary temperature and weather conditions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
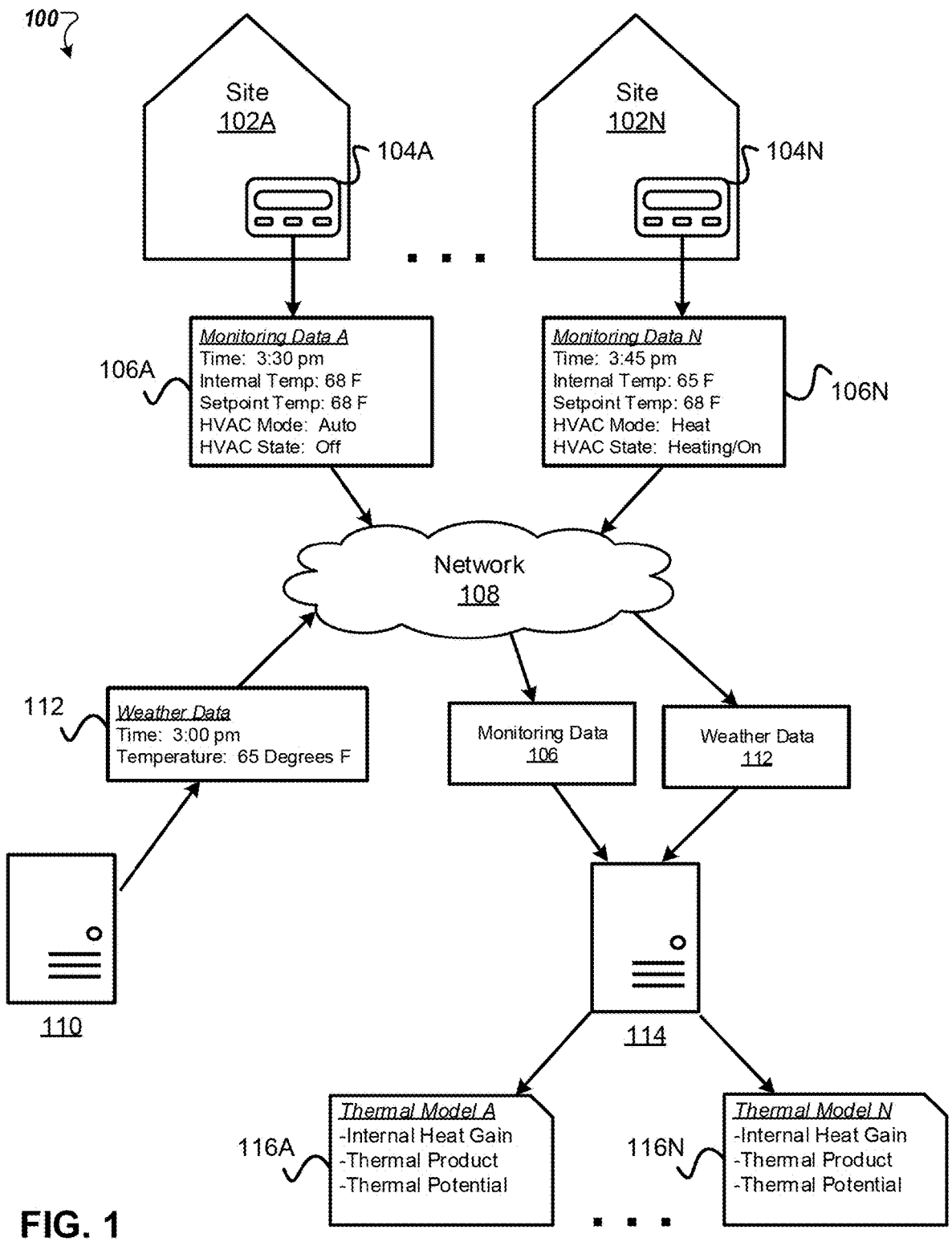
FIG. 1 is an exemplary diagram of a thermal modeling network.

FIG. 1 is an exemplary diagram of a thermal modeling network 100. The thermal modeling network 100 includes a network 108, such as a local area network (LAN), a wide area network (WAN), the Internet, or any combination thereof. The network 102 connects sites 102A-N, a weather server 110 and a thermal modeling server 114. The thermal modeling network 100 may include many different sites 102, weather servers 110, and thermal modeling servers 114.

The sites 102A-N can include one or more sites, such as a house, an apartment, a commercial building, a floor of a building, a particular room in a house, apartment, or building, and the like. The sites 102A-N can include monitoring systems 104A-N that are configured to collect monitoring data 106A-N at the sites 102A-N. There can be one or more monitoring systems 104A-N at each of the sites 102A-N. The monitoring systems 104 can include control units configured to control a heating or cooling system located at a corresponding site 102. For example, monitoring system 104A can be located at site 102A and include a thermostat that is configured to control a heating, ventilation, and air conditioning (HVAC) system located at site 102A. The monitoring systems 104A-N can be used to collect monitoring data 106A-N corresponding to the sites 102A-N. The monitoring data 106 can include temperature data measured inside the sites 102A-N, mode data of the sites 102A-N, state data of the sites 102A-N, setpoint temperature from the monitoring systems 104A-N of the sites 102A-N, and the like.

In some examples, the temperature data measured inside a particular site can include a present temperature of the site as well as previous temperatures of the site. The temperature data can be measured by the monitoring systems 104 in Fahrenheit, Celsius, or any temperature measurement. The monitoring systems 104 may be configured to store historical temperature data over a period of time. The period of time can be one day, one week, one month, multiple months, and the like.

In certain examples, the mode data can include a present mode of the heating or cooling system as well as historical mode data of the heating or cooling systems. The mode data can include a heat mode, a cool mode, an automatic or auto mode, an off mode, a fan/on mode, and a fan/auto mode. The monitoring systems 104 may be configured to store historical mode data of the heating or cooling systems over a period of time. The period of time can be one day, one week, one month, multiple months, and the like.

In some examples, the state data of the sites 102A-N can include a present state of the heating or cooling systems as well as historical state data of the heating or cooling systems. The state data can include heating/off, heating/on, cooling/off, cooling/on, off, fan/on, and fan/off. Further, the state data can include multiple stages of heating and/or cooling, (e.g., stage 2 cooling).

Referring to FIG. 1, site 102A includes monitoring system 104A. Monitoring system 104A is configured to provide monitoring data 106A to the thermal modeling server 114 via the network 108. In this instance, the monitoring system 104A is configured to control an HVAC system located at site 102A. In certain aspects, multiple monitoring systems 104A-N may be configured to control a single HVAC system located at a particular site. In other aspects, a single monitoring system may be configured to control multiple HVAC systems located at one or more sites 102A-N. The monitoring data 106A includes a present time of 3:30 pm, a present temperature inside site 102A of 68 degrees Fahrenheit, a present HVAC mode that is set to auto, and a present HVAC state that is set to off. Site 102N includes monitoring system 104N. In this instance, monitoring system 104N is configured to control an HVAC system located at site 102N. Monitoring system 104N is configured to provide monitoring data 106N to the thermal modeling server 114 via the network 108. The monitoring data 106N includes a present time of 3:45 pm, a present temperature inside site 102N of 65 degrees Fahrenheit, a present HVAC mode that is set to heat, and a present HVAC state that is set to heating/on.

In some aspects, the monitoring systems 104A-N may be interconnected across sites 102A-N. There may be multiple monitoring systems 104A-N located at a single site. Additionally, a single monitoring system may be used to provide monitoring data for multiple sites 102A-N. The monitoring systems 104-N may be connected over the network 108. In this instance, the connected monitoring systems 104A-N may be used by the thermal modeling server 114 to generate thermal models for each of the sites. The thermal models may be used to implement an optimal control strategy across a plurality of connected sites 102A-N using the connected monitoring systems 104A-N located at each corresponding sites 102A-N. The thermal models that are generated for each of the sites 102A-N will be discussed further herein.

The weather server 110 can include one or more servers configured to store weather data. The weather data can correspond to weather proximate to the sites 102A-N, temperature external to the sites 102A-N, and the like. The weather data can be associated with time stamps. Further, the weather data can include historical or forecasted future weather data.

The weather server 110 is configured to provide weather data 112 to the thermal modeling server 114 over the network 108. As such, the thermal modeling server 114 receives the monitoring data 106 from the monitoring systems 104A-N and the weather data 112 from the weather server 114. In some aspects, the thermal modeling server 114 transmits a request to the monitoring systems 104A-N for the monitoring data 106 and a request to the weather server 110 for the weather data 112. In this instance, the monitoring systems 104A-N and the weather server 110 may be configured to actively store data, and passively provide the data to the thermal modeling server 114 upon reception of the request. In other aspects, the monitoring systems 104 and the weather server 110 are configured to persistently transmit data to the thermal modeling server 114. In this instance, the monitoring systems 104 and the weather server 114 may be configured to transmit the corresponding monitoring data 106 and weather data 112 continuously, in real-time or near real-time, to the thermal modeling server 114. Additionally, or alternatively, the monitoring systems 104 and the weather server 110 may be configured to transmit the corresponding monitoring data 106 and weather data 112 over predetermined intervals of time to the thermal modeling server 114. For example, the monitoring data 106 and weather data 112 may be transmitted to the thermal modeling server 114 at intervals, such as every minute, every hour, every day, and the like, The monitoring systems 104A-N can be configured to regularly transmit data to the thermal modeling server 114. Alternatively, or additionally, the thermal modeling server 114 may be configured to poll the monitoring systems 104A-N. When thermal modeling is performed by the thermal modeling server 114, a query may be made from the thermal modeling server 114 to the monitoring systems 104A-N as well as to the weather server. In some aspects, the monitoring data 106 and the weather data 112 may be received by the thermal modeling server 114 simultaneously, to be aligned and further processed.

The thermal modeling server 114 receives the monitoring data 106 and the weather data 112. The thermal modeling server 114 can be configured to align the monitoring data 106 and the weather data 114 in order to determine characteristics of the sites 102A-N. For example, the thermal modeling server 114 may align received monitoring data 106, such as indoor temperature data, setpoint temperature data, mode data, and state data, with the received weather data 112. Specifically, the thermal modeling server 114 may be configured to align the data over predetermined intervals of time to determine the characteristics of the sites 102A-N. The intervals of time can be predetermined at the thermal modeling server 114 and include any amount of time. In some aspects, the intervals of time may be determined by the thermal modeling server 114 in real-time or near-real time based on the received monitoring data 106 and weather data 112.

The characteristics of the sites 102A-N can include one or more heat flow characteristics, energy consumption characteristics, thermal characteristics, and the like. In certain aspects, the thermal modeling server 114 determines characteristics including an internal heat gain, a thermal product, and a thermal potential for each of the sites 102A-N. For example, the thermal modeling server 114 can be configured to determine an internal heat gain representing an amount of heat generated at each of the sites 102A-N. In this instance, the amount of heat generated at the sites 102A-N is irrespective of any heat provided by the heating or cooling systems of the sites 102A-N. Therefore, the internal heat gain characteristics of the sites 102A-N may represent heat generated by the sites 102A-N due to factors external from the heating or cooling systems, such as ambient light, appliances, internal lighting, and the like. The internal heat gain may be represented as a function of time. The time can correspond to a point within a calendar year. In this instance, the internal heat gain of a site can be represented as a series or parametrization of data points over time, the points representing internal heat gain of the site at particular days, weeks, or months over the course of a calendar year.

In another example, the thermal modeling server 114 can be configured to determine a thermal product for each of the sites 102A-N. The thermal product can represent a product of a determined thermal capacitance and thermal resistance of each of the sites 102A-N. The thermal capacitance and the thermal resistance may be determined by the server 114 based on the aligned data. The thermal product of a particular site can represent a characteristic time scale of heat transfer in the particular site.

In another example, the thermal modeling server 114 can be configured to determine a thermal potential for each of the sites 102A-N based on the aligned data and/or the determined thermal product. The thermal potential may represent how each of the sites 102A-N behaves in response to the heating or cooling systems being in the on state. For example, the thermal potential of a particular site may be 30 degrees Fahrenheit. In this example, the thermal potential of 30 degrees Fahrenheit may represent that the presence of an HVAC system at the particular site causes the indoor temperature at the particular site to evolve as if the temperature external to the site was 30 degrees cooler.

The thermal modeling server 114 can use the determined characteristics of the sites 102A-N to generate thermal models 116A-N for each of the sites 102A-N. The thermal modeling server 114 may generate one or more thermal models 116A-N for each of the sites. The thermal models 116A-N can be generated for each of the sites 102 based on one or more of an internal heat gain, a thermal product, a thermal potential, a steady state model, and a representative thermal model associated with each site. The thermal models 116A-N represent how each corresponding site 102A-N may react to arbitrary setpoint temperatures and external temperatures such as weather, and initial conditions. Specifically, the thermal models 116A-N may represent how each corresponding site 102A-N reacts to arbitrary setpoint time-series, weather timeseries, initial conditions of indoor temperature, and the mode and state of heating or cooling systems located at the sites 102A-N.

The thermal models 116A-N can enable the thermal modeling server 114 to simulate each site 102A-N under the arbitrary conditions. The thermal models 116A-N may be generated so that an optimal control strategy for a load control event may be determined by the server 114 or another one or more servers.

For example, the thermal models 116A-N may be generated and output to determine an optimal control strategy for a load control event. The control strategy can be determined based on the thermal models 116A-N of the sites 102A-N as well as the monitoring systems 104A-N associated with the sites 102A-N. Each thermal model 116A-N can include information that may be used to predict how a particular site 102 and/or particular monitoring system 104 will perform under particular control strategy parameters. For example, the control strategy can be determined by using the thermal models 116A-N to simulate different control strategy parameters and optimize a demand response event. In this example, the control strategy can be utilized to provide a desired amount of load reduction across multiple sites or monitoring systems by adjusting control units (e.g., connected thermostats, control systems for energy consuming devices, etc.) of each of the customers. By adjusting the control units of each of the sites, the control strategy can be implemented to provide a demand response event optimized to a predefined objective.

The thermal modeling server 114 may be configured to generate the thermal models as a predetermined amount of monitoring data 106 and weather data 112 is received. The predetermined amount of data can be compared against a data threshold by the server 114. Once the data threshold is satisfied, the thermal modeling server 114 may be configured to automatically generate thermal models 116A-N for each of the respective sites 102A-N.

Figure 2:
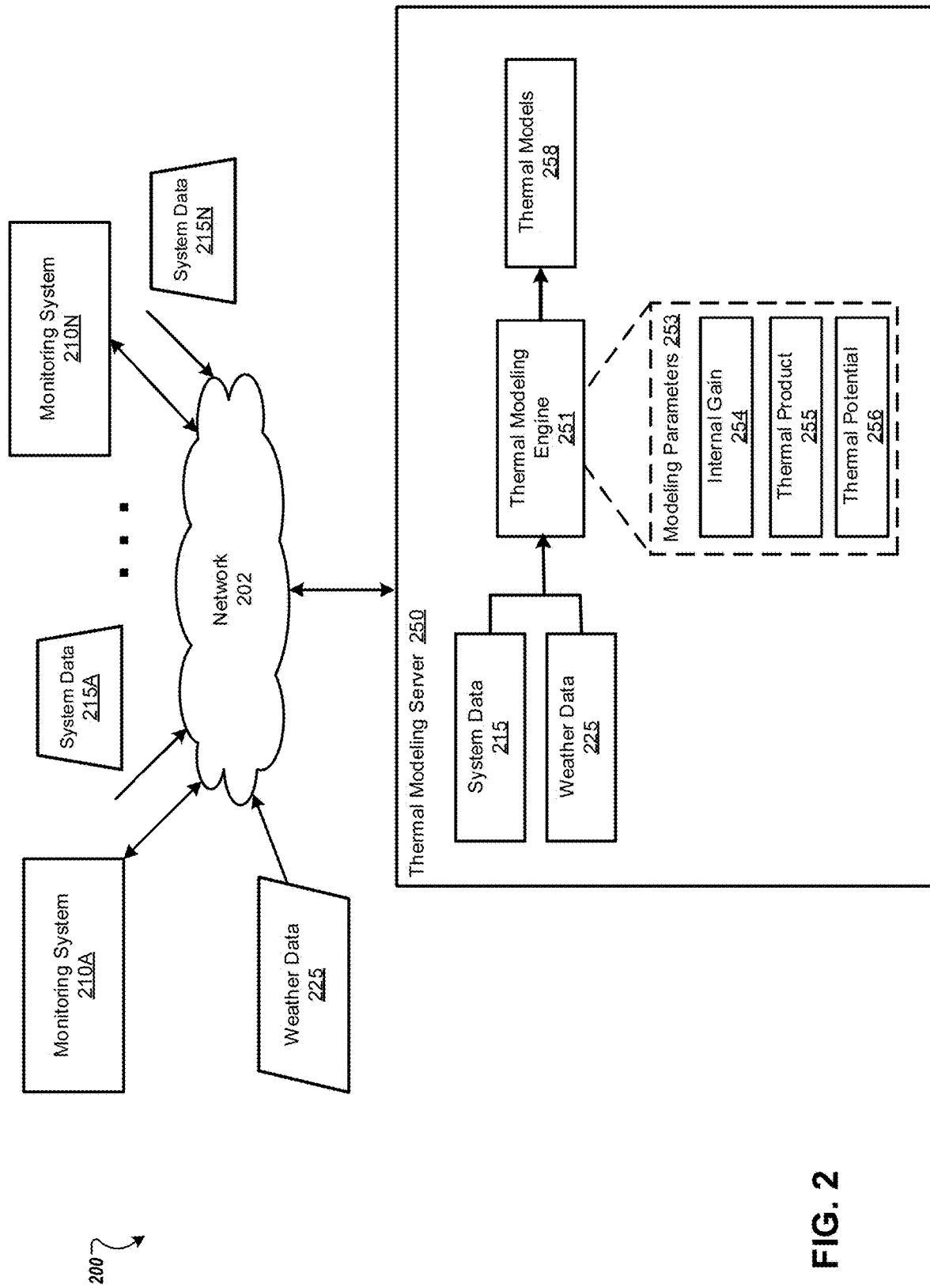
FIG. 2 is an exemplary diagram of a thermal modeling system.

FIG. 2 is an exemplary diagram of a thermal modeling system 200. The system 200 includes monitoring systems 210A-N and a thermal modeling server 250 connected via a network 202. The network 202 can include any network that is known such as a local area network (LAN), a wide area network (WAN), the Internet, or any combination thereof. The system 200 may include many different monitoring systems 210A-N, weather servers 220, and thermal modeling servers 250.

The monitoring systems 210A-N can include energy consuming systems, energy consuming devices, and/or energy controls for energy consuming devices such as an HVAC system, a thermostat, a heating/pump system, an electric vehicle, a solar-power system, electric resistive or heat pump water heater, and the like. The monitoring systems 210A-N can each be associated with a particular site, such as a house, an apartment, a floor of a building, a particular room in a house, apartment, or building, and the like. The monitoring systems 210 can be configured to adjust energy consumption of energy consuming devices at the sites via control units located at the sites. For example, if a particular monitoring system corresponds to an HVAC system connected to a thermostat, the particular consumption system can be configured to monitor temperature at the site and adjust the temperature of the thermostat, thereby adjusting the energy consumption of the HVAC system.

The monitoring systems 210A-N can each be associated with system data 215A-N. The system data 215A-N can include historical data corresponding to each of the monitoring systems 210A-N. For example, if a particular monitoring system corresponds to an HVAC system connected to a thermostat, the system data 215 can include previous temperature data as well as HVAC runtime data. Further, the system data 215 can include adjustments to a particular consumption system based on previously implemented control. For example, the system data 215 can include data indicating temperature adjustment information as well as a duration of the temperature adjustments.

The weather data 225 can be provided to the control strategy system 240 via the network 202. The weather data 225 can include present and forecasted outdoor temperature, and past outdoor temperature. Specifically, the weather data 225 can correspond to weather at geographic locations at or near the monitoring systems 210A-N, or rather, weather at geographic locations at or near the sites associated with the monitoring systems 210A-N. In certain aspects, the weather data 225 can be provided to the thermal modeling server 250 by a weather server over the network 202. In other aspects, the weather data 225 may be provided to the thermal modeling server 250 by temperature sensors of the monitoring systems 210A-N.

The thermal modeling server 250 can be connected to the monitoring systems 210 via the network 202. Further, the thermal modeling server 250 can be configured to receive system data 215 of the monitoring systems 210 and weather data 225 via the network 202. The thermal modeling server 220 can be configured to generate thermal models for sites associated with the monitoring systems 210 in response to receiving the system data 215 and the weather data 225. The thermal models can be based on various parameters determined from the received data and can be used to a simulate energy consumption of the sites under arbitrary internal and external temperatures. In some examples, the thermal models may be comprised of the various parameters determined from the received data.

The thermal modeling server 250 can be configured to align the received system data 215 and the weather data 225. The system data 215 and the weather data 225 can be aligned to generate thermal models 250, or any other type of energy consumption models, using indoor temperature data of the system data 215 and outdoor temperature data of the weather data 225. The aligned data can be used by the thermal modeling server 250 to determine characteristics of each site associated with a corresponding monitoring system 210.

The thermal modeling server 250 can be configured to pass the aligned data to a thermal modeling engine 251. The thermal modeling engine 251 can be configured to determine modeling parameters 253 for each of the sites associated with the monitoring systems 210. In certain aspects, the thermal modeling engine 251 can be used by the thermal modeling server 250 to calibrate models according to sites. In certain aspects the calibrated models can correspond to the thermal models 258. For example, the thermal modeling engine 251 can be used to calibrate a thermal model of a particular site. The thermal model can be based on characteristics of the particular site such as an internal heat gain 254, a thermal product 255, and a thermal potential 256 of the particular site. The internal heat gain 254 of the site can be determined by the thermal modeling engine 251 to capture objects within the site that generate heat at the site as well as incident sunlight that generates heat at the site. The thermal product 255 of the site can be determined by the thermal modeling engine 251 to capture aspects of a thermal capacitance and a thermal resistance of the site. The thermal potential 256 of the heating or cooling system of the site can be determined by the thermal modeling engine 251 to capture the ability of an energy consuming system, such as an HVAC system, to remove heat from the site. In some aspects, the thermal product 255 and the thermal potential 256 of a site are determined based on the internal heat gain 254 of the site.

The thermal modeling server 250 can use the aligned data to generate thermal models 258. The thermal models 258 can correspond to models of the sites associated with each of the monitoring systems 210. In an example, the thermal models 258 can represent energy consumption models of the sites. In this instance, the thermal models 258 can be used to determine how the sites would consume energy under predetermined conditions and/or parameters. In certain aspects, the thermal models 258 can be energy consumption models that correspond to models of pool heating, pool pump usage, car heating/cooling, electric car energy consumption, solar-energy system, hot water heater, and the like. In certain aspects, multiple thermal models 258 can be generated for each of the sites, with each model being associated with a different monitoring system 210 associated with the site.

In certain aspects, the thermal modeling server 250 can be configured to perform simulations of load control events using the thermal models 250. The simulations can be performed for the sites under current or forecasted weather conditions. For example, the simulations can be performed to simulate how each of the sites would react to adjustments of the monitoring systems 210 under current or forecasted weather conditions. In another example, the simulations can be performed to simulate how each of the sites would react under various modeling error scenarios. As such, the thermal modeling server 250 can simulate how each of the sites would react when a physical parameter is estimated incorrectly.

The thermal modeling server 250 can be a database server including one or more storage devices, such as a database. The modeling parameters 253 for the thermal models 258 can be stored in the database. In certain aspects, the modeling parameters be stored in the database for future reference by the thermal modeling engine 251. For example, the thermal modeling engine 251 may reference a previously generated thermal model to determine modeling parameters 253 for a new for which a thermal model has not been generated. The thermal modeling server 250 can store various data in the database. For example, the thermal modeling server 250 can store system data 215, weather data 225, and the like, in the database for future reference.

Figure 3:
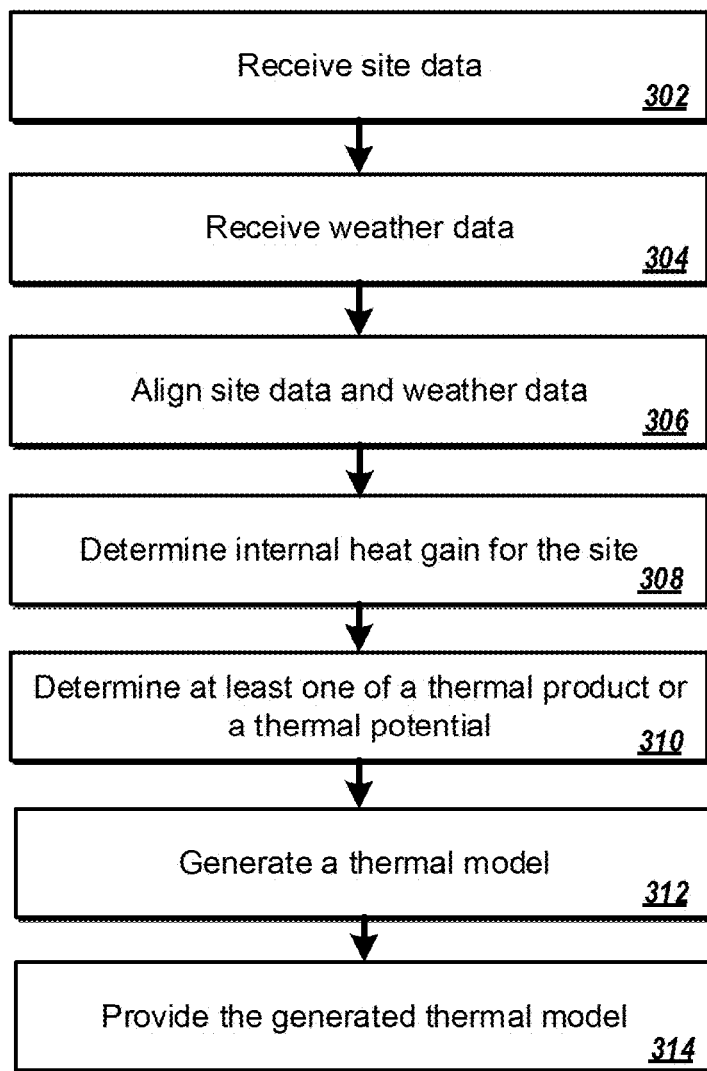
FIG. 3 is a flow chart illustrating an example process for generating and providing thermal models.

FIG. 3 is a flow chart illustrating an example process 300 for generating and providing thermal models. The process 300 can be performed by one or more servers or other computing devices. For example, operations of the process 300 can be performed by server 114 of FIG. 1. Operations of the process 300 can also be implemented as instructions stored on a non-transitory computer readable medium, and when the instructions are executed by the one or more servers (or other computing devices,) the instructions cause the one or more servers to perform operations of the process 300.

At step 302, the thermal modeling server receives site data. The site data can include monitoring data corresponding to a particular site that is received by the thermal modeling server over time. In this instance, the monitoring data can be provided to the thermal modeling server by a monitoring system of the site. In some aspects, the monitoring data is provided to the thermal modeling server by another server that is connected to the monitoring system of the site. The site data can include temperature data measured inside the site, setpoint temperature, mode data, and state data. For example, the temperature data can include temperature measurements by a thermostat located at the site. The mode data can include current and/or historical mode data of the heating or cooling system located at the site. The state data can include current and/or historical state data of the heating or cooling system located at the site.

At step 304, the thermal modeling server receives weather data. The weather data can be provided to the thermal modeling server by a weather server. The weather data can correspond to current and/or historical weather data. The weather data can correspond to weather data descriptive of weather at a location of the site. For example, the weather data can correspond to outdoor temperature. The outdoor temperature can correspond to weather data including fluctuations of temperature external to the site. In some aspects, historical and/or forecast temperature readings are stored in a database and accessed by the thermal modeling server. In other aspects, the historical and/or forecast readings are provided to the thermal modeling server by an external server or computing device, such as the weather server.

At step 306, the thermal modeling server aligns the site data and the weather data. The thermal modeling server can be configured to align the site data and the weather data over predetermined time intervals such as every second, every minute, every four hours, every week, and the like. Specifically, the thermal modeling server aligns the received temperature data, mode data, and state data of the site with the received weather data corresponding the site.

At step 308, the thermal modeling server determines an internal heat gain for the site. The thermal modeling server can be configured to determine the internal heat gain for the site based on the aligned data. The internal heat gain for the site can represent an amount of heat generated at the site irrespective of the heating or cooling system. For example, the thermal modeling server can determine heat generation characteristics of the site based on the aligned data. The heat generation characteristics can include characteristics of the site that are distinct from a heating or cooling system of the site. In this instance, the thermal modeling server can be configured to use the heat generation characteristics to determine the internal heat gain for the site.

In some examples, the thermal modeling server determines the internal heat gain based on a determined deadband at the site. In this instance, the thermal modeling server may be configured to determine a deadband of the heating or cooling system associated with the site prior to the determination of the internal heat gain. The thermal modeling server can determine that a monitoring system of a site controlling a heating or cooling system, such as a thermostat, includes a deadband such as a temperature range in which the thermostat cycles between an upper temperature setpoint and lower temperature setpoint. For example, the site may be determined to include an internal temperature setpoint of 72 degrees Fahrenheit with a thermostat that cycles between a deadband range 0.5 degrees Fahrenheit below the temperature setpoint and 0.5 degrees Fahrenheit above the temperature setpoint.

At step 310, the thermal modeling server determines at least one of a thermal product for the site or a thermal potential for the heating or cooling system of the site. The thermal product for the site can be determined based on the received site data such as the temperature data, the mode data, and the state data. The thermal potential for the heating or cooling system of the site can be determined based on the aligned data as well as the determined thermal product.

In certain aspects, the thermal modeling server can further be configured to determine an efficiency directed to the site based on the aligned data. The efficiency directed to the site may represent a heating or cooling system efficiency of the site, a thermal product efficiency for the site, an internal heat gain efficiency for the site, and the like.

The efficiency directed to the site can be based on determined thermal efficiency parameters such as a rate of entropy production at the site, a rate of irreversibility of the heating or cooling system, and the like. The thermal efficiency parameters may be used by the thermal modeling system to determine an overall efficiency of the particular site. For example, the heating or cooling system efficiency may be represented as a coefficient of performance that indicates how effective the heating or cooling system is in heating or cooling the site per unit of work. Specifically, the coefficient of performance may be defined as the ratio of heat transferred per unit of energy consumed at a particular site, parameterized by a relative entropy production rate that is estimated from the aligned data. Further, the coefficient of performance may be defined as the ratio between the physical entropy production rate of the heating or cooling system at a site and the power the heating or cooling system consumes, and can be expressed in terms of indoor and outdoor temperature.

In some aspects, the thermal modeling server can be configured to determine a steady state model for the site. The steady state model can be determined based on the aligned data. The steady state model can correspond to a function that maps the difference between the indoor temperature of the site and the temperature external to the site to an estimated duty cycle for the heating or cooling system associated with the monitoring system of the site. The duty cycle estimates the proportion of time the heating or cooling system is cycled on when observed over many on/off cycles. The steady state model may be rejected by the thermal modeling server based on various conditions, including insufficient aligned data or irregularities in dependence of duty cycle on the difference between indoor temperature of the sit and temperature external to the site.

At step 312, the thermal modeling server generates a thermal model for the site. The thermal model can be generated based on the internal heat gain and at least one of the thermal product and the thermal potential. As such, the thermal model can be generated based on modeling parameters including any combination of internal heat gain, thermal product, and thermal potential. The thermal model can also be generated based on the determined efficiency for the heating or cooling system associated with the monitoring system of the site. In some aspects, the thermal model can be generated based in part on the determined steady state model for the site.

In some examples, the thermal model can be a simple thermal model. The simple thermal model can include a single thermal product and thermal potential. The simple thermal model can also include a single pair of coefficients representing an upper temperature threshold and a lower temperature threshold of a site. The pair of coefficients may correspond to a determined deadband of the site in which the heating or cooling system of the site cycles between the upper and lower temperature thresholds.

In another example, the thermal model can be a hybrid thermal model. The hybrid thermal model may include multiple sets of thermal product and thermal potential pairs. In the case of two sets, the first set of a thermal product and thermal potential corresponds to deadband cycles that include aligned data series segments where indoor temperature cycles between its deadband limits. Further, the second set of a thermal product and thermal potential corresponds to transient cycles that include aligned data series segments that occur between the deadband cycles, such as after a setpoint temperature change, when the indoor temperature is instantly rendered outside of the new deadband.

The pairs of coefficients in the hybrid thermal model can represent shorter cycles of the site such as deadband cycles, as well as longer cycles of the site such as transient cycles of the site. The use of multiple coefficients can be used to account for potential errors that may arise when using only a single pair of coefficients for the site to generate the thermal model. Specifically, the deadband cycles may be more susceptible to errors that bias the determined properties of the site. For example, the duration of deadband cycles may be significantly affected by an activation of a heating or cooling system that differs from a corresponding timestamp of monitoring data that indicates the state and mode of the heating or cooling system. In another example, the duration of determined deadband cycles may not account for a delay in the heating or cooling of the site. In this instance, the deadband cycles may not account for the lag between when a heating or cooling system provides heating or cooling at a site and when the internal temperature of the site adjusts accordingly.

The thermal model can include variants such as a simple thermal model and a hybrid thermal model to account for state changes that occur at the sites. For example, the deadband at a particular site may change. As such, the particular site can include multiple upper temperature setpoints and lower temperature setpoints defining historical and current deadbands of the site. The variants may be used individually or in combination for the sites to represent how the sites behave over short periods of time as well as longer periods of time over varying internal temperature conditions of the sites.

At step 314, the thermal modeling server provides the generated thermal model for output. The generated thermal model can be provided to another server for analysis. The generated thermal model may be analyzed by the another server to characterize heat flow at a site. In another example, the generated thermal model can be used to determine an amount of power consumed by the heating or cooling system of the site. The generated thermal model can be provided for output and used for performing simulations of arbitrary internal and external conditions at the site. The simulations may be performed on the generated thermal model to simulate how the site would react to predetermined temperature adjustments inside the site during predetermined weather conditions external to the site.

Figure 4:
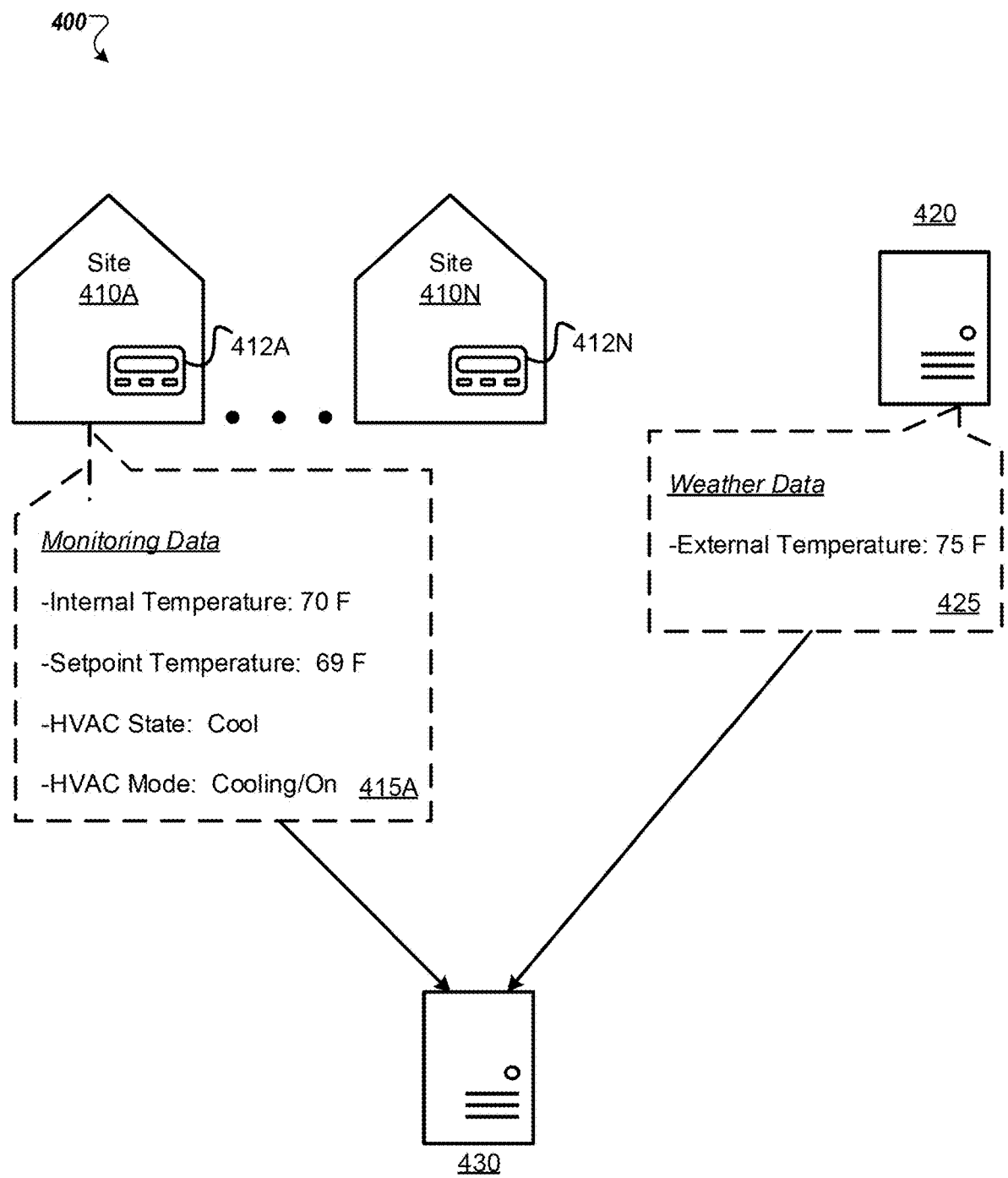
FIG. 4 is an exemplary diagram of thermal modeling input data.

FIG. 4 is an exemplary diagram of thermal modeling input data 400. The thermal modeling input data 400 includes sites 410A-N that provide monitoring data, a weather server 420 that provides weather data, and a thermal modeling server 430 that receives the monitoring data and the weather data. The thermal modeling input data 400 may be transmitted to the thermal modeling server 430 and used by the thermal modeling server 430 to generate thermal models for the sites 410A-N under varying conditions. The sites 410A-N can include one or more sites such as a house, an apartment, a floor of a building, a particular room in a house, apartment, or building, and the like. The sites 420A-N can include monitoring systems 412A-N that are configured to collect monitoring data at the sites 420A-N. For example, site 410A may include a single monitoring system 412A. The monitoring system 412A may include a control unit that is configured to control a heating or cooling system located at the site 410A.

The monitoring system 412A can include a thermostat that is configured to control an HVAC system located at the site 410A. The monitoring system 412A can be used to collect monitoring data 415A corresponding to the site 410A. The monitoring data 415A can include temperature data measured inside the site 410A, temperature setpoint data of the monitoring device 412, mode data of the HVAC system of the site 415A, state data for the HVAC system of the site 410A, and the like. For example, the monitoring system 412 of FIG. 4 may collect monitoring data of the site 410A including an internal temperature of 70 degrees Fahrenheit, a setpoint temperature of 69 degrees Fahrenheit an HVAC state set to cool the site 410A, and an HVAC mode of cooling/on.

The weather server 420 can include one or more servers configured to store and provide weather data. The weather data can correspond to weather proximate to the sites 410A-N, temperature external to the sites 410A-N, and the like. The weather data can be associated with time stamps. Further, the weather data can include historical weather data. The weather server 420 is configured to provide weather data to the thermal modeling server 430. The weather server 420 may provide weather data 425 corresponding to a temperature external to the site 410A. For example, the weather server 420 may transmit weather data 425 including an external temperature of 75 degrees Fahrenheit.

The thermal modeling server 430 receives the monitoring data 415A from the monitoring systems 412A-N and the weather data 425 from the weather server 420. The monitoring data 415A and the weather data 425 may be used by the thermal modeling server 430 as inputs for the generation of a thermal model. In this instance, the monitoring data 415A and the weather data 425 are used as input to generate a thermal model associated with the site 410A that illustrates heat flow at the site 410A.

Figure 5:
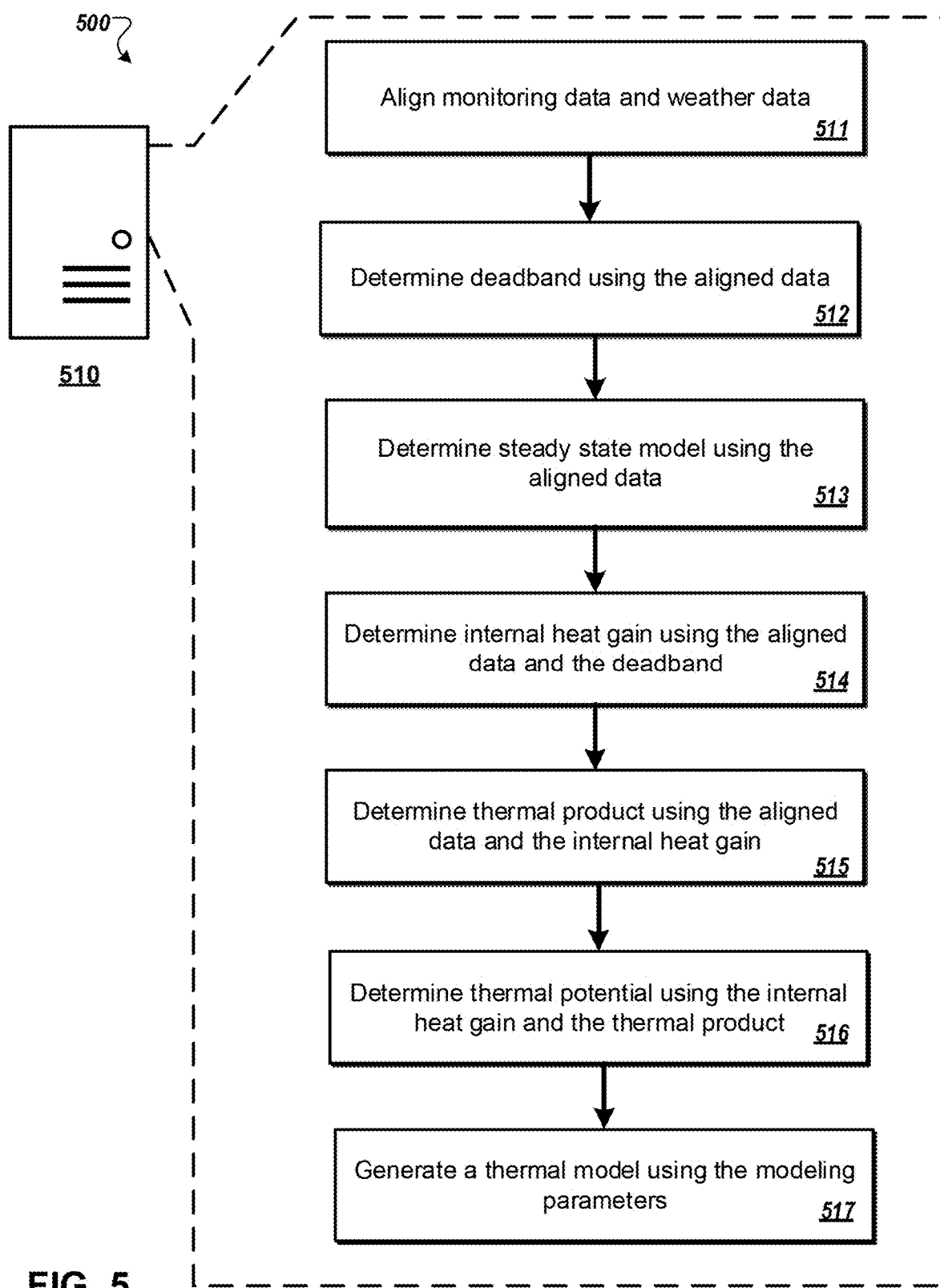
FIG. 5 is an exemplary diagram of thermal model generation.

FIG. 5 is an exemplary diagram of thermal model generation 500. The thermal model generation includes a thermal modeling server 510 configured to generate a thermal model using various received data. In certain aspects, the thermal modeling server 510 is configured to perform a sequence of steps to determine modeling parameters in the generation of the thermal model.

At step 511, the thermal modeling server 510 aligns received monitoring data and weather data. The monitoring data can include individual readings from a monitoring system located at a particular site. The weather data can include readings from a weather server that describe a temperature external to the particular site. The aligned data can be used by the thermal modeling server 510 to determine characteristics of the particular site such as modeling parameters.

At step 512, the thermal modeling server 510 determines a deadband using the aligned data. Specifically, the thermal modeling server 510 may be configured to determine the deadband of a heating or cooling system, such as a thermostat, associated with the particular site. The thermal modeling server 510 can determine that the thermostat of the particular site includes a deadband such as a temperature range in which the thermostat cycles between an upper temperature setpoint and lower temperature setpoint. For example, the thermal modeling server 510 may determine that the particular site includes a temperature setpoint of 72 degrees Fahrenheit with a thermostat that cycles between a deadband range of 0.5 degrees Fahrenheit above the temperature setpoint and 0.5 degrees Fahrenheit below the temperature setpoint.

At step 513, the thermal modeling server 510 determines a steady state model using the aligned data. The steady state model can correspond to a function that maps the difference between the internal temperature of the site and the temperature external to the site to an estimated duty cycle. The thermal modeling server can also be configured to determine a deadband for the control unit associated with the monitoring system of the site, which is determined by the aligned data. The deadband can include an upper temperature threshold above a setpoint temperature and a lower temperature threshold below the setpoint temperature between which the control unit cycles in controlling the heating or cooling system to meet the setpoint temperature.

At step 514, the thermal modeling server 510 determines an internal heat gain using the aligned data and the deadband. The internal heat gain for the site can represent an amount of heat generated at the site irrespective of the heating or cooling system. For example, the thermal modeling server can determine heat generation characteristics of the site based on the aligned data. The heat generation characteristics can include characteristics of the site that are distinct from a heating or cooling system of the site. In this instance, the thermal modeling server can be configured to use the heat generation characteristics in addition to the determined deadband to determine the internal heat gain for the site.

At step 515, the thermal modeling server 510 determines a thermal product using the aligned data and the internal heat gain. In certain aspects, the thermal product for the particular site can be determined based on data such as temperature data, mode data, and state data of the particular site. The thermal product of a particular site can represent a characteristic time scale of heat transfer in the particular site.

At step 516, the thermal modeling server 510 determines a thermal potential using the internal heat gain and the thermal product. Specifically, the thermal potential can correspond to the heating or cooling system of the particular site. The thermal potential may be based on a difference between the weather data or temperature external to the particular site and the temperature inside the site. In other words, the thermal potential may represent a removal of heat inside the site by the heating or cooling system, such as the increase or respective decrease in the rate of overall heat gain within the site when the heating or cooling system is on, in comparison to when the heating or cooling system is off.

At step 517, the thermal modeling server 510 generates a thermal model for the particular site. The thermal model can be generated based a combination of the steady state model, the deadband, the internal heat gain, the thermal product, and the thermal potential. The generated thermal model may represent how the particular site reacts to arbitrary setpoint temperatures and external temperatures such as weather, given initial conditions. The thermal modeling server 510 can use the generated thermal model to simulate each the particular site under the arbitrary conditions. The thermal model may be used in combination with thermal models for other sites to determine an optimal control strategy for a load control event in which the particular site and the other sites are enrolled.

In some aspects, the thermal modeling server 510 is configured to perform the steps 511-517 of FIG. 5 non-sequentially. In this instance, the thermal modeling server 510 may be configured to determine two or more modeling parameters in parallel. Alternatively, or additionally, the thermal modeling server 510 may be configured to perform the steps out of sequence.

Figure 6:
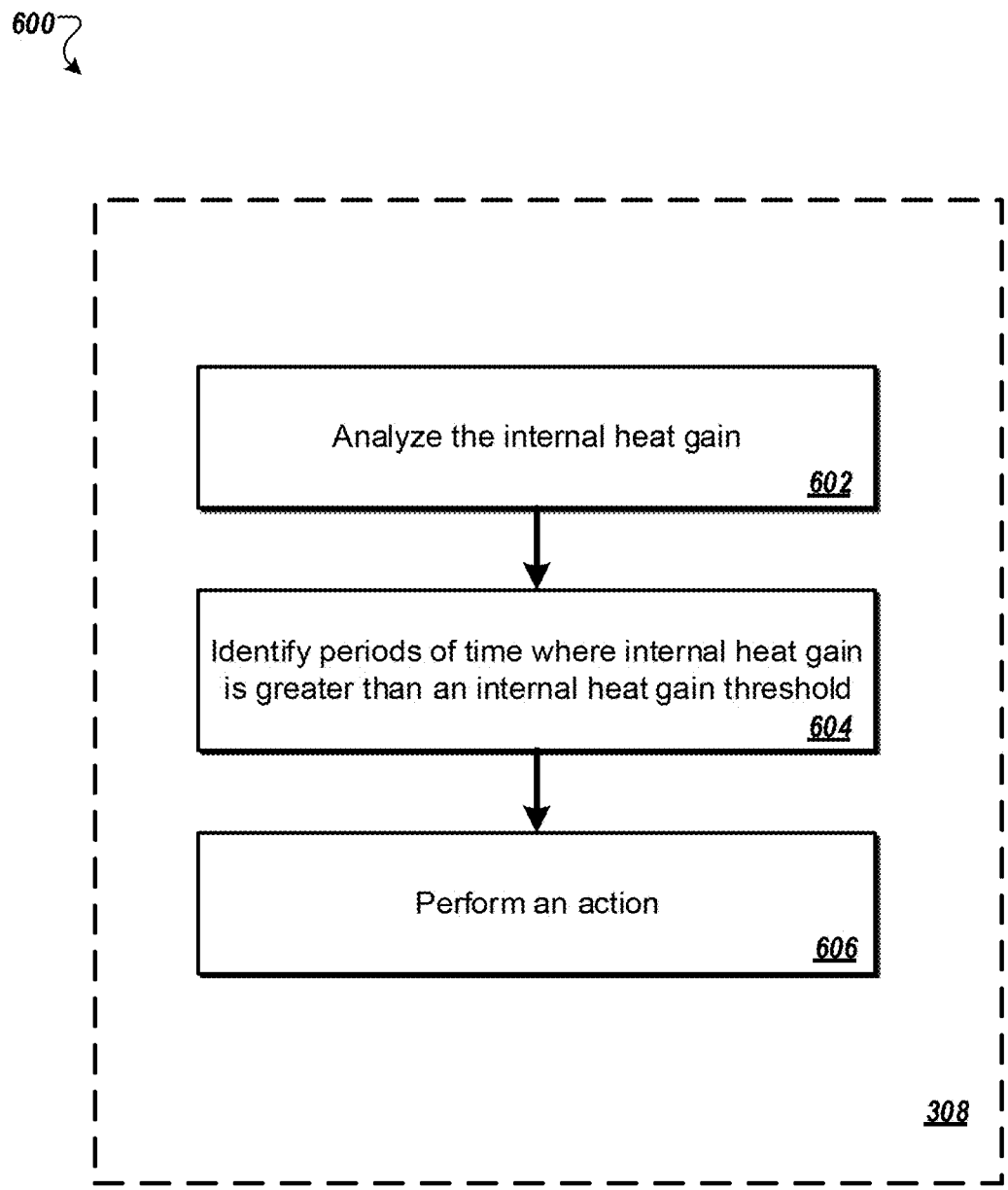
FIG. 6 is a flow chart illustrating an example process for addressing internal heat gain to generate a thermal model.

FIG. 6 is a flow chart illustrating an example process 600 for an example process for addressing internal heat gain to generate a thermal model. The process 600 can include a subprocess for step 308 of FIG. 3. The process 600 can be performed by one or more servers or other computing devices. For example, operations of the process 600 can be performed by server 114 of FIG. 1. Operations of the process 600 can also be implemented as instructions stored on a non-transitory computer readable medium, and when the instructions are executed by the one or more servers (or other computing devices,) the instructions cause the one or more servers to perform operations of the process 600.

At step 602, the thermal modeling server analyzes the internal heat gain for the site. The thermal modeling server may analyze the internal heat gain over time. For example, the thermal modeling server may analyze the internal heat gain over the span of an hour, a day, a week, and the like.

At step 604, the thermal modeling server identifies periods of time where the internal heat gain for the site is greater than a predetermined internal heat gain threshold. The thermal modeling server is configured to identify the periods of time based on the analysis of the internal heat gain. For example, the identified periods of time can be used by the thermal modeling server to determine peaks of internal heat gain at the site.

At step 606, the thermal modeling server performs an action. In certain aspects, the actions can be used to adjust energy consumption of the site. For example, the actions can include providing a recommendation of an adjustment to a schedule of the control unit. In another example, the actions can include automatically adjusting the schedule of the control unit. The actions can also include providing a recommendation of an adjustment to the state of the heating or cooling system. In another example, the actions can include providing a recommendation of an adjustment to a characteristic of the site. Further, the actions can include providing runtime and cost forecasting for the heating or cooling system in light of forecasted weather and settings for the control unit. In another example, the actions can include providing a notification to a remote device that corresponds to the efficiency of the site.

Figure 7A:
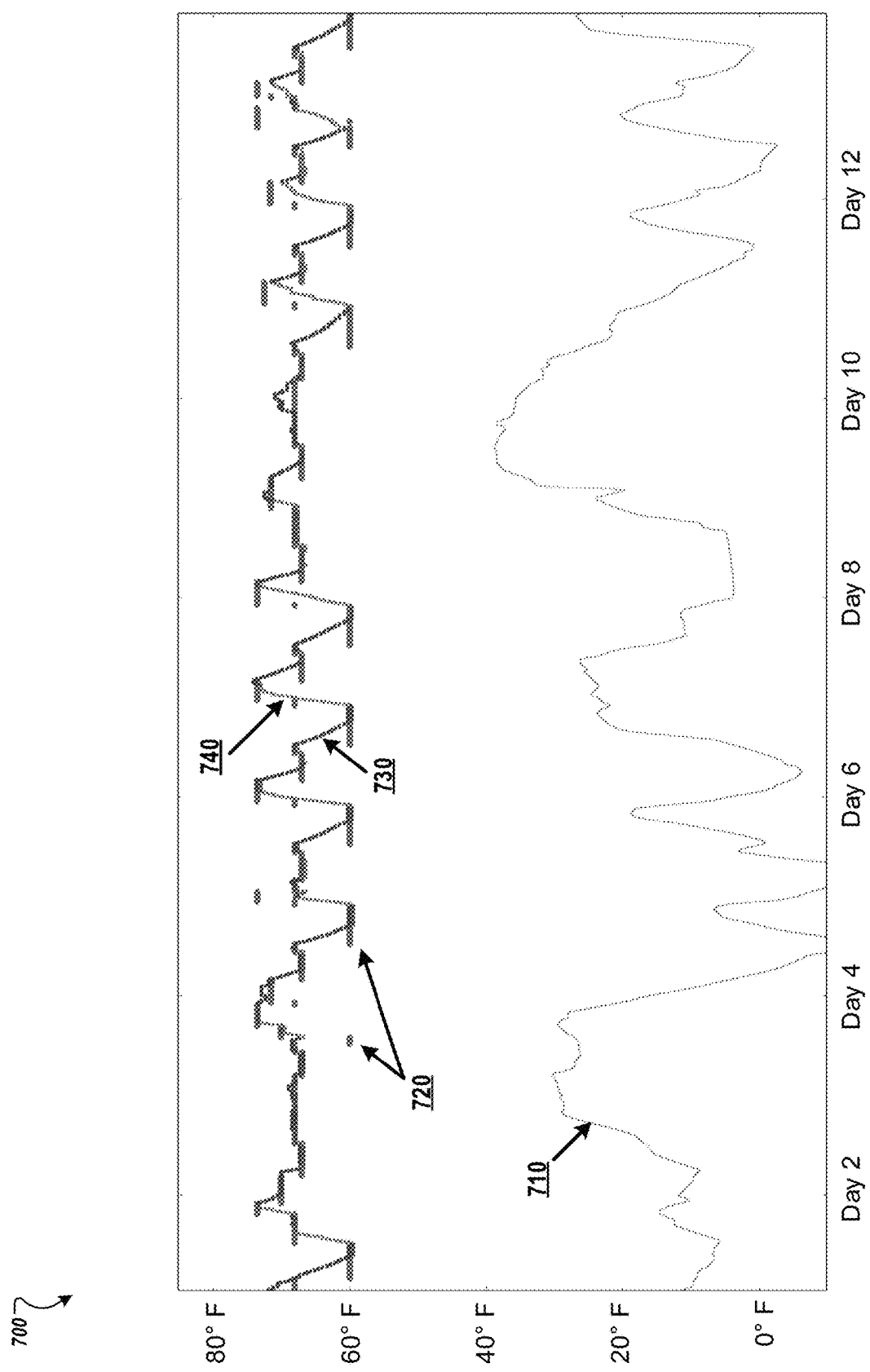
FIG. 7A is an exemplary diagram of temperature data.

FIG. 7A is an exemplary diagram of temperature data 700. The temperature data 700 includes outdoor temperature 710, temperature setpoints 720, indoor temperature when heating is off 730, and indoor temperature when heating is on 740. The temperature data 700 describes multiple temperature time series over a period of time in which heating occurs at a particular site. Specifically, the temperature data 700 describes an instance of outdoor temperature that is below the indoor temperature, in which the indoor temp declines over time. The temperature data 700 illustrates various temperature data of a particular site that may be used as input in the generation of a thermal model for the particular site.

The outdoor temperature 710 is a time series of outdoor temperature data points. The outdoor temperature 710 represents the weather or temperature external to the particular site. The outdoor temperature 710 includes a range of temperatures with temperature lows below 0 degrees Fahrenheit, and temperature highs rising to about 40 degrees Fahrenheit. The outdoor temperature 710 represents a plurality of outdoor temperature points over the span of multiple days.

The temperature setpoints 720 include a time series of setpoint temperatures of a heating system located at the particular site. The temperatures setpoints 720 include setpoints between 60 degrees Fahrenheit and 80 degrees Fahrenheit. The temperature setpoints 720 represent a plurality of temperature setpoints of a heating system located at the particular site over the span of multiple days.

The indoor temperature when heating is off 730 is a time series of internal temperature data of the particular site. Generally, the indoor temperature when heating is off 730 represents a declining set of internal temperatures at the particular site. This set of indoor temperatures is measured over multiple intervals of time in which heating is not actively being performed by a heating system at the site. In this instance, the indoor temperature when heating is off 730 represents indoor temperature readings during "off cycles" of the heating system. For example, when there is no internal heat gain, the indoor temperature will trend towards the outdoor temperature over time. In some examples, the indoor temperature may trend towards the outdoor temperature at a rate that is the reciprocal of the determined thermal product.

The indoor temperature when heating is on 740 is another time series of internal temperature data of the particular site. Generally, the indoor temperature when heating is on 740 represents a rising set of internal temperatures at the particular site. This set of indoor temperatures is measured over multiple intervals of time in which heating is actively being performed by a heating system at the site. In this instance, the indoor temperature when heating is on 740 represents indoor temperature readings during "on cycles" of the heating system. For example, when the heating system is on, the heating system effectively adds the thermal potential to the outdoor temperature. In this instance, the indoor temperature rises as a result of the net, effective temperature being greater than the respective indoor temperature.

Figure 7B:
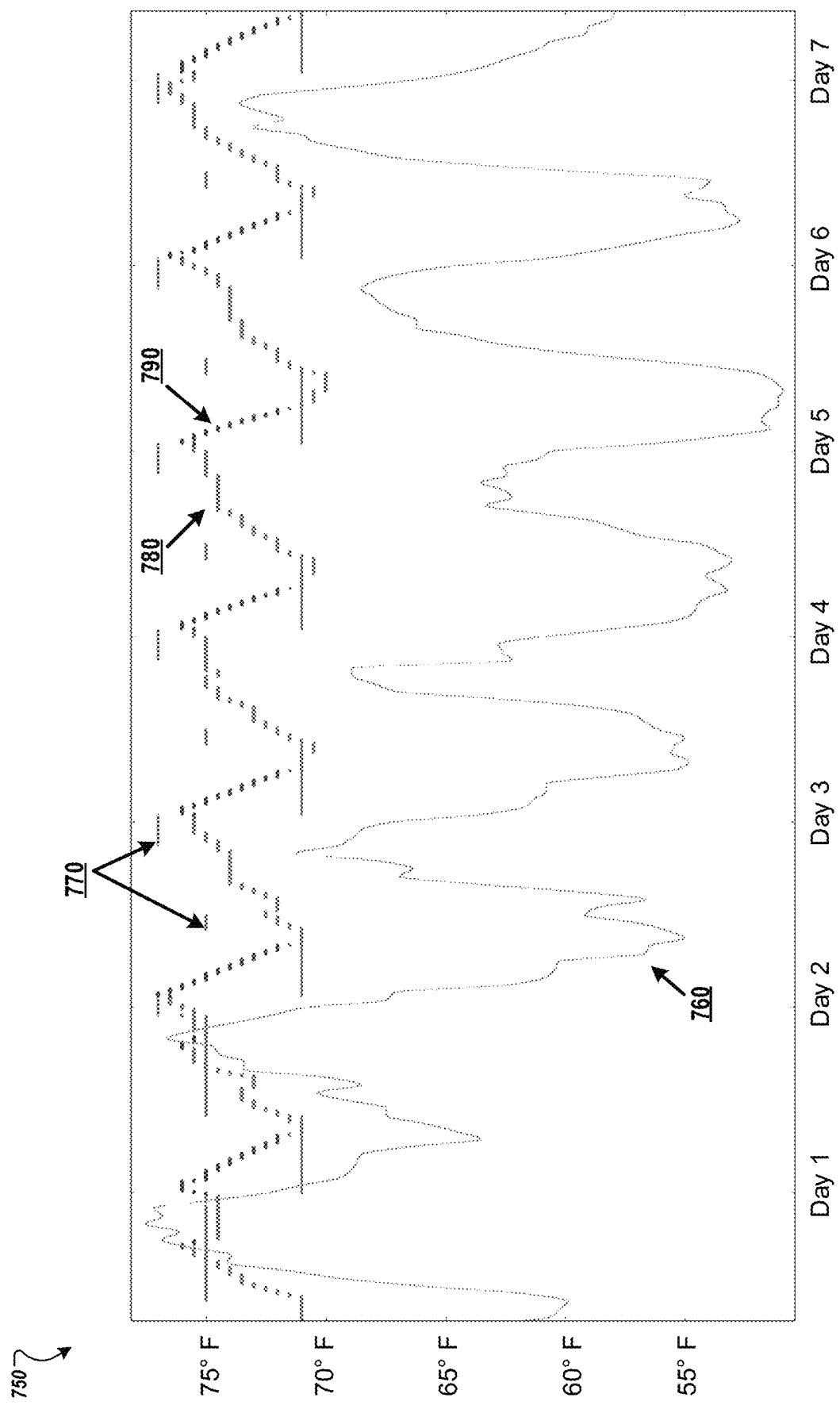
FIG. 7B is an exemplary diagram of temperature data.

FIG. 7B is an exemplary diagram of temperature data 750. The temperature data 750 includes outdoor temperature 760, temperature setpoints 770, indoor temperature when cooling is off 780, and indoor temperature when cooling is on 790. The temperature data 750 describes multiple temperature time series over a period of time in which cooling occurs at a particular site. The temperature data 750 illustrates various temperature data of a particular site that may be used as input in the generation of a thermal model for the particular site.

The outdoor temperature 760 is a time series of outdoor temperature data points. The outdoor temperature 760 represents the weather or temperature external to the particular site. The outdoor temperature 760 includes a range of temperatures with temperature lows below 55 degrees Fahrenheit, and temperature highs rising above 75 degrees Fahrenheit. The outdoor temperature 760 represents a plurality of outdoor temperature points over the span of multiple days.

The temperature setpoints 770 include a time series of setpoint temperatures of a cooling system located at the particular site. The temperatures setpoints 770 include setpoints ranging between 70 degrees Fahrenheit and 80 degrees Fahrenheit. The temperature setpoints 770 represent a plurality of temperature setpoints of a cooling system located at the particular site over the span of multiple days.

The indoor temperature when cooling is off 780 is a time series of internal temperature data of the particular site. Generally, the indoor temperature when cooling is off 780 represents a rising set of internal temperatures at the particular site. This set of indoor temperatures is measured over multiple intervals of time in which cooling is not actively being performed by the cooling system at the site. In this instance, the indoor temperature when cooling is off 780 represents indoor temperature readings during "off cycles" of the cooling system.

In some examples, the outdoor temperature 760 is far lower than the respective indoor temperature, however the internal temperature of the particular site still rises. For example, at Day 4 of FIG. 7B the outdoor temperature 760 is relatively low and the internal temperature while cooling is off 780 is inclining. As such, there may be sources of heat generation located within the particular site. If there were no sources of heat generation, the indoor temperature would tend toward the lower, outdoor temperature, rather than rise. In certain aspects, the sources of heat generation located within the particular site are characterized and modeled as internal heat gain of the particular site.

The indoor temperature when cooling is on 790 is another time series of internal temperature data of the particular site. Generally, the indoor temperature when cooling is on 790 represents a declining set of internal temperatures at the particular site. This set of indoor temperatures is measured over multiple intervals of time in which cooling is actively being performed by the cooling system at the site. In this instance, the indoor temperature when cooling is on 790 represents indoor temperature readings during "on cycles" of the cooling system.

Figure 8A:
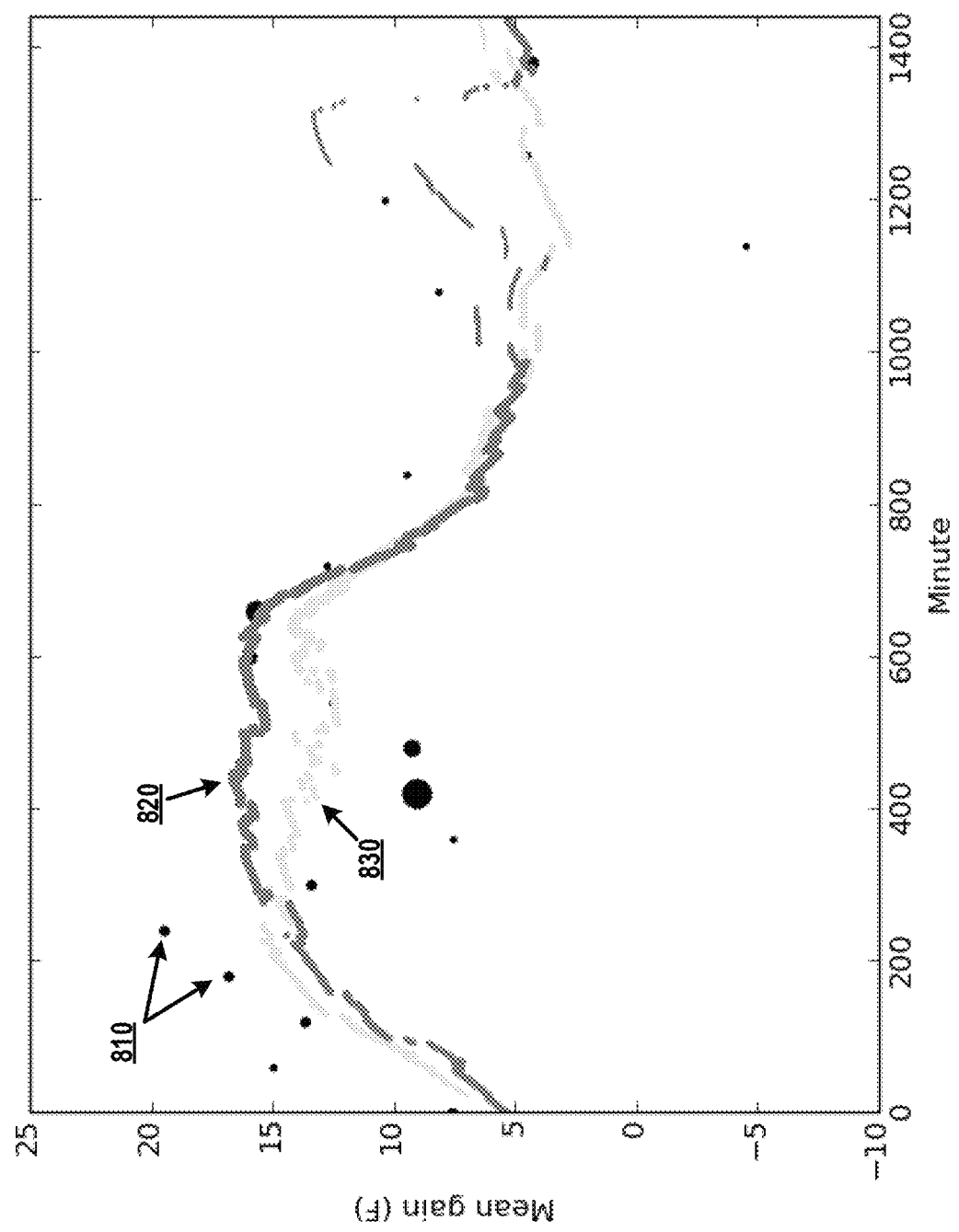
FIG. 8A is an exemplary diagram of an internal gain plot.

FIG. 8A is an exemplary diagram of an internal gain plot 800. The internal gain plot 800 includes estimated internal heat gain 810, an estimated upper bound for internal heat gain 820, and an estimated lower bound for internal heat gain 830. The internal gain plot 800 describes a diagnostic plot of internal heat gain data for a particular site. In this example, the internal heat gain data is measured in degrees Fahrenheit over the span of multiple days. In other words, the internal heat gain data across multiple days is overlaid on top of one another in the internal gain plot 800 for the particular site and projected onto minutes over the span of each day.

The estimated internal heat gain 810 is denoted by multiple points on the internal gain plot 800 of various sizes. The estimated internal heat gain 810 represents an estimated gain value at a particular point in time such as a particular minute. The size of each point of the estimated internal heat gain 810 represents the confidence of each particular estimate. As such, the greater the size of each point of estimated internal heat gain 810, the greater the confidence that the estimated internal heat gain 810 is likely to be accurate of the actual internal heat gain at the designated point in time, or minute of time.

The estimated upper bound for internal heat gain 820 denotes an estimated upper bound for the estimated internal heat gain of the particular site. The estimated upper bound for internal heat gain 820 may be illustrated as points representing single instances in time, or short segments representing intervals of time over the span of a particular day. For example, a short segment of the estimated upper bound for internal heat gain 820 may correspond to an entire on or off cycle for a heating or cooling system located at the particular site.

For each of the overlaid days of data, the estimated upper bound for internal heat gain 820 varies over the span of the 1440 minutes in a calendar day and ranges from about 5 degrees Fahrenheit to 15 degrees Fahrenheit. In certain aspects, the estimated internal heat gain 810 is greater than the estimated upper bound for internal heat gain 820. In this instance, the estimated internal heat gain 810 and the estimated upper bound for internal heat gain 820 corresponds to different days of internal heat gain data estimation.

The estimated lower bound for internal heat gain 830 denotes an estimated lower bound for the internal heat gain of the particular site. The estimated lower bound for internal heat gain 830 may be illustrated as points representing single instances in time, or short segments representing intervals of time over the span of a particular day. For example, a short segment of the estimated lower bound for internal heat gain 830 may correspond to an entire on or off cycle for a heating or cooling system located at the particular site.

For each of the overlaid days of data, the estimated lower bound for internal heat gain 830 varies over the span of 1440 minutes and ranges from about 5 degrees Fahrenheit to 15 degrees Fahrenheit. In certain aspects, the estimated internal heat gain 810 is less than the estimated lower bound for internal heat gain 830. In this instance, the estimated internal heat gain 810 and the estimated lower bound for internal heat gain 830 corresponds to different days of internal heat gain data estimation.

The internal gain plot 800 of FIG. 8A illustrates that the internal heat gain parameter of a site is typically a positive quantity. Although the estimated internal heat gain 810 for sites may generally range from about 5 degrees Fahrenheit to 15 degrees Fahrenheit, the estimated internal heat gain for sites can fall outside this particular range of internal heat gain values.

The internal gain plot 800 includes data from multiple different days to illustrate the periodicity of the estimated internal heat gain 810, the estimated upper bound for internal heat gain 820, and the estimated lower bound for internal heat gain 830. For example, at minute 0 the upper bound 820 and the lower bound 830 are measured at around 5 degrees Fahrenheit across multiple days. At minute 600, the upper bound 820 and the lower bound 830 are measured at about 15 degrees Fahrenheit. Then, at minute 1200, the upper bound 820 falls to between 5 and 10 degrees Fahrenheit and the lower bound 830 falls back to about 5 degrees Fahrenheit. Thus, the internal gain plot 800 describes the internal heat gain of a particular site with a prominent, daily periodicity. As such, the estimated internal heat gain of sites may be attributed with a strong daily frequency component that varies between about 5 and 15 degrees Fahrenheit.

Figure 8B:
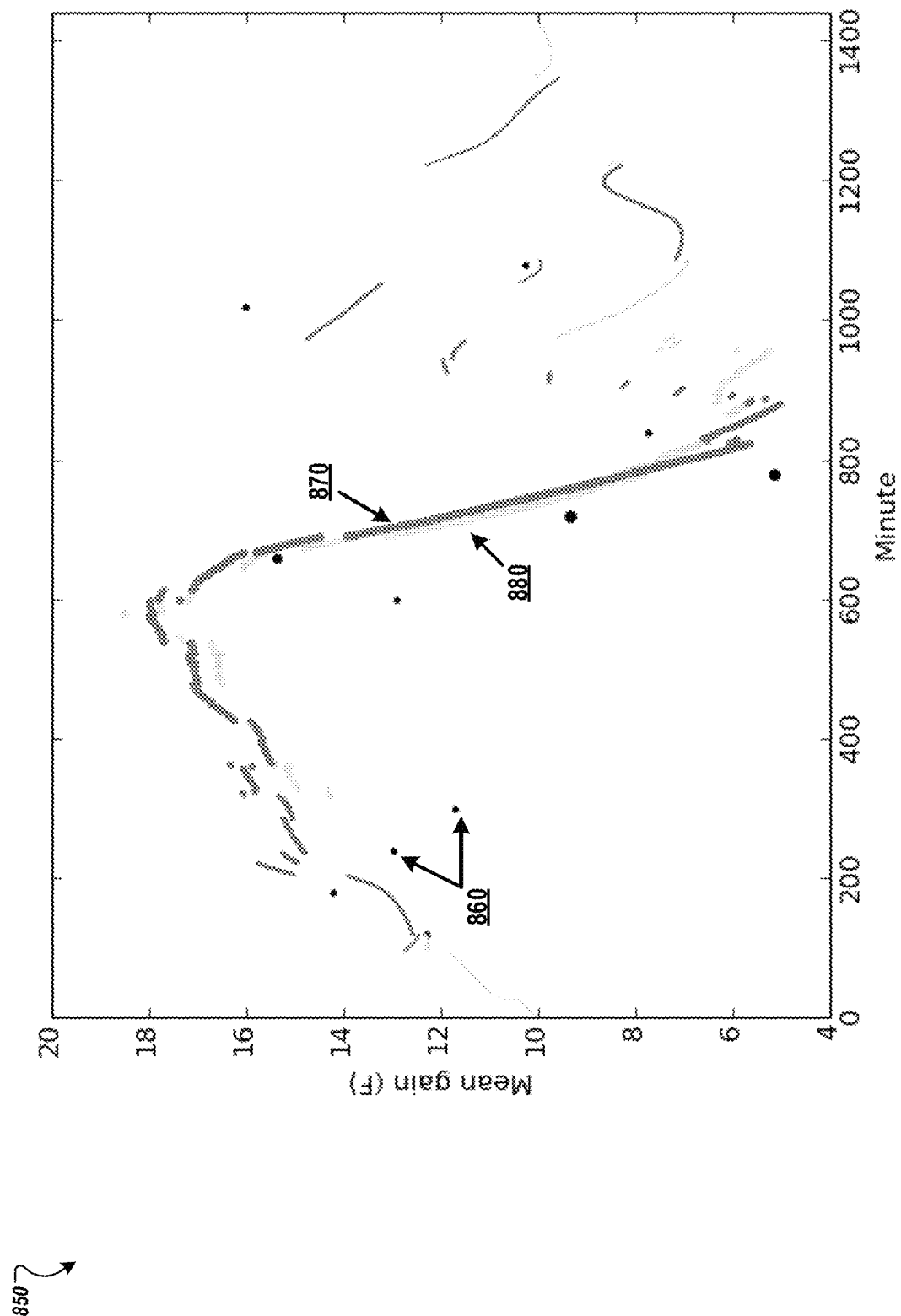
FIG. 8B is an exemplary diagram of an internal gain plot.

FIG. 8B is an exemplary diagram of an internal gain plot 850. The internal gain plot 850 includes estimated internal heat gain 860, an estimated upper bound for internal heat gain 870, and an estimated lower bound for internal heat gain 880. The internal gain plot 850 describes a diagnostic plot of internal heat gain data for a particular site that is different from the site characterized by the internal gain plot 800 of FIG. 8A. In this example, the internal heat gain data is measured in degrees Fahrenheit over the span of multiple days. In other words, the internal heat gain data across multiple days is overlaid on top of one another in the internal gain plot 850 for the particular site and projected onto minutes over the span of each day.

The estimated internal heat gain 860 is denoted by multiple points on the internal gain plot 850 of various sizes. The estimated internal heat gain 860 represents an estimated gain value at a particular point in time such as a particular minute. The size of each point of the estimated internal heat gain 860 represents the confidence of each particular estimate. As such, the greater the size of each point of estimated internal heat gain 860, the greater the confidence that the estimated internal heat gain 860 is likely to be accurate of the actual internal heat gain at the designated point in time, or minute of time.

The estimated upper bound for internal heat gain 870 denotes an estimated upper bound for the estimated internal heat gain of the particular site. The estimated upper bound for internal heat gain 870 may be illustrated as points representing single instances in time, or short segments representing intervals of time over the span of a particular day. For example, a short segment of the estimated upper bound for internal heat gain 870 may correspond to an entire "on/off cycle" for a heating or cooling system located at the particular site.

For each of the overlaid days of data, the estimated upper bound for internal heat gain 870 varies over the span of 1440 minutes and ranges from about 5 degrees Fahrenheit to 18 degrees Fahrenheit. In certain aspects, the estimated internal heat gain 860 is greater than the estimated upper bound for internal heat gain 870. In this instance, the estimated internal heat gain 860 and the estimated upper bound for internal heat gain 870 may correspond to different days of internal heat gain data estimation.

The estimated lower bound for internal heat gain 880 denotes an estimated lower bound for the estimated internal heat gain of the particular site. The estimated lower bound for internal heat gain 880 may be illustrated as points representing single instances in time, or short segments representing intervals of time over the span of a particular day. For example, a short segment of the estimated lower bound for internal heat gain 880 may correspond to an entire "on/off cycle" for a heating or cooling system located at the particular site.

For each of the overlaid days of data, the lower bound for estimated lower bound for internal heat gain 880 varies over the span of 1440 minutes and ranges from about 5 degrees Fahrenheit to 18 degrees Fahrenheit. In certain aspects, the estimated internal heat gain 860 is less than the estimated lower bound for internal heat gain 880. In this instance, the estimated internal heat gain 860 and the estimated lower bound for internal heat gain 880 may correspond to different days of internal heat gain data estimation.

The internal gain plot 850 includes data from multiple different days to illustrate the periodicity of the estimated internal heat gain 860, the estimated upper bound for internal heat gain 870, and the estimated lower bound for internal heat gain 880. For example, at minute 200 the upper bound 870 and the lower bound 880 are measured at around 12 degrees Fahrenheit across multiple days. At minute 800, the upper bound 870 and the lower bound 880 are measured at about 6 degrees Fahrenheit. Then, at minute 1400, the upper bound 870 and lower bound 880 rise to about 10 degrees Fahrenheit. Thus, the internal gain plot 850 describes the internal heat gain of another particular site with a prominent, daily periodicity.

However, in comparison to FIG. 8A, FIG. 8B illustrates a sharper transition between internal heat gain measurements of estimation for the particular site. Although, the internal heat gain plot 850 of FIG. 8B maintains the positive, internal heat gain quantity and the prominent, daily periodicity, the internal heat gain plot 850 also transitions between high and low estimations of internal heat gain 860 over shorter amounts of time over the span of each day (in contrast to the longer transition periods of the internal gain plot 800 of FIG. 8A).

Figure 9:
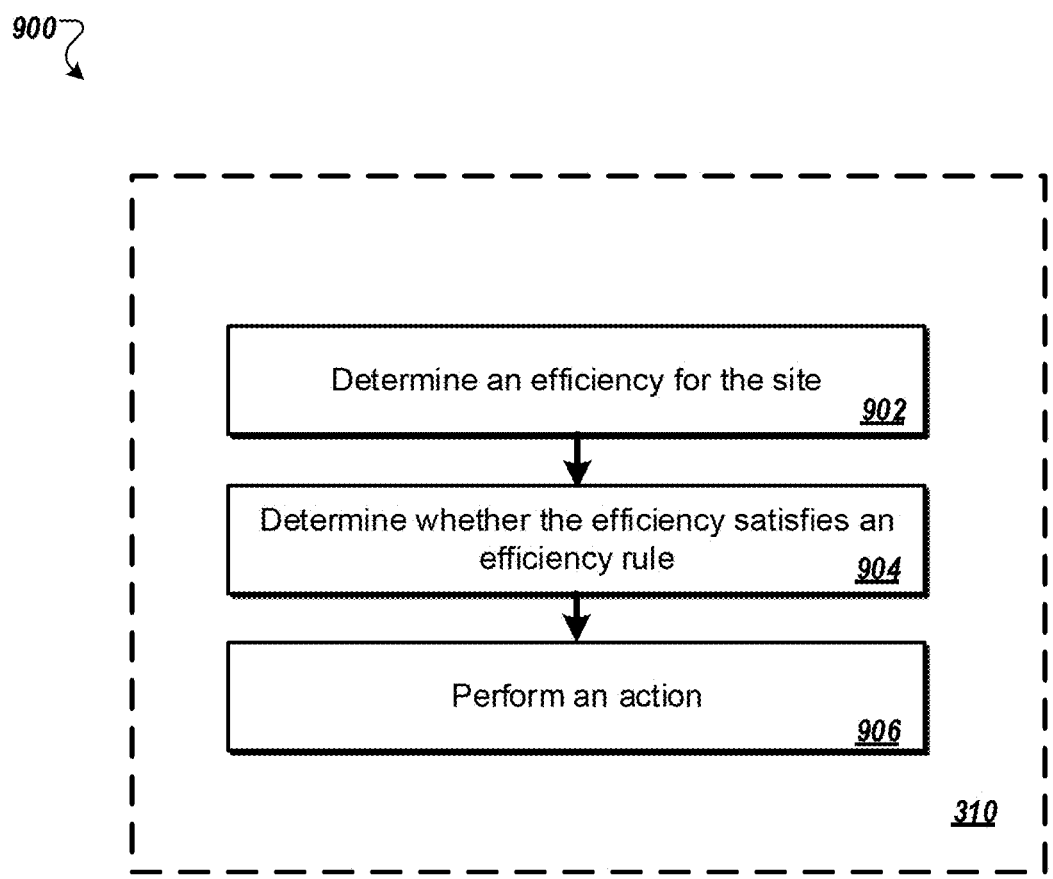
FIG. 9 is a flow chart illustrating an example process for performing an action.

FIG. 9 is a flow chart illustrating an example process 900 for performing an action. The process 900 can include a subprocess for step 310 of FIG. 3. The process 900 can be performed by one or more servers or other computing devices. For example, operations of the process 900 can be performed by server 114 of FIG. 1. Operations of the process 900 can also be implemented as instructions stored on a non-transitory computer readable medium, and when the instructions are executed by the one or more servers (or other computing devices,) the instructions cause the one or more servers to perform operations of the process 900.

At step 902, the thermal modeling server determines an efficiency directed to the site. The efficiency directed to the site can be determined based on the aligned data. The efficiency can be determined based on a heating or cooling system efficiency for the site, a thermal product efficiency for the site, an internal heat gain efficiency for the site, or any combination thereof. For example, the efficiency for the heating or cooling system may represent an efficiency of a heating system to heat the site and/or an efficiency of a cooling system to cool the site.

At step 904, the thermal modeling server determines whether the efficiency satisfies a predetermined efficiency rule. For example, the efficiency rule can be used to determine whether or not the heating or cooling system is operating to satisfy the efficiency rule. The efficiency rule can be predetermined for the site. For example, the efficiency rule can be determined prior to the generation of the thermal model for the site. In another example, the efficiency rule may be automatically determined based on a generated thermal model associated with the site.

In another example, the thermal product efficiency can be used to determine whether or not the thermal product of the site satisfies the efficiency rule. In certain aspects, the thermal product represents a product of the thermal capacitance of the site and the thermal resistance of the site. In this instance, the thermal modeling server may further determine whether or not the thermal capacitance and the thermal resistance satisfy respective rules for each.

At step 906, the thermal modeling server performs an action. The thermal modeling server can be configured to perform the action in response to determining that the efficiency rule is not satisfied. In certain aspects, the provided action corresponds to an improvement in an energy efficiency of the site. For example, the action can include providing a notification to a remote device indicating that the site is poorly insulated based on the unsatisfied thresholds and that the site may need to change the windows at the site to better maintain heat within the site.

Figure 10:
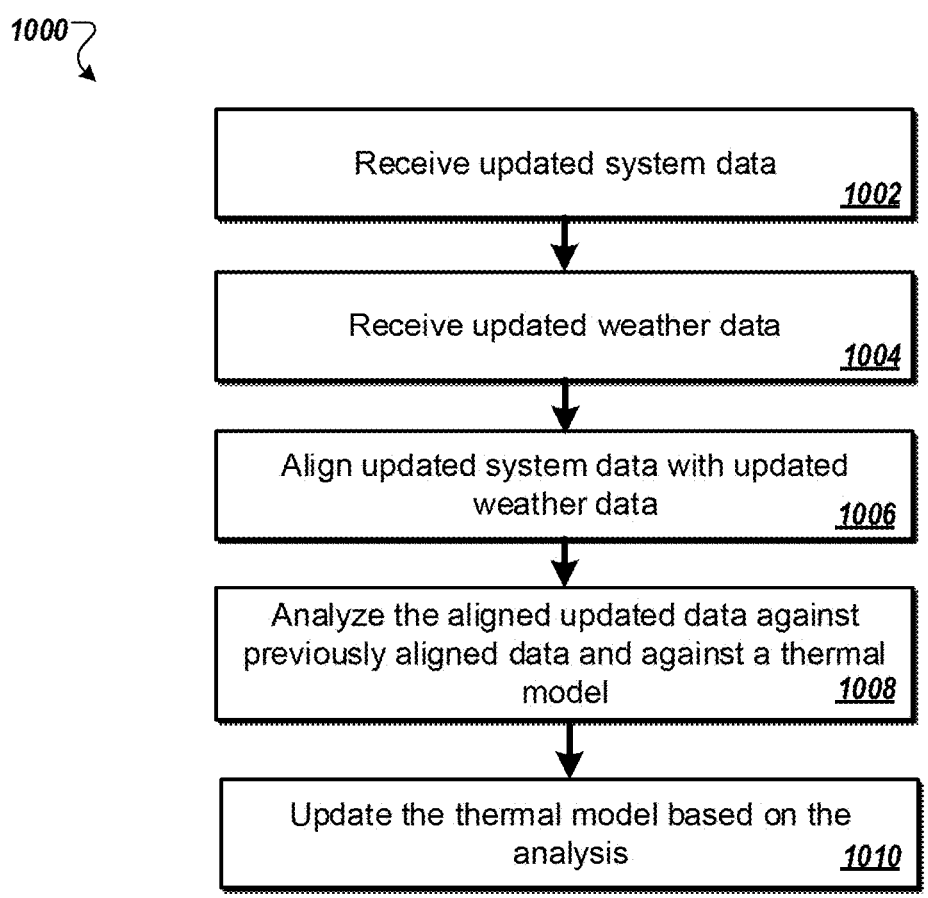
FIG. 10 is a flow chart illustrating an example process for updating thermal models.

FIG. 10 is a flow chart illustrating an example process 1000 for updating thermal models. The process 1000 can be performed by one or more servers or other computing devices. For example, operations of the process 1000 can be performed by server 114 of FIG. 1. Operations of the process 1000 can also be implemented as instructions stored on a non-transitory computer readable medium, and when the instructions are executed by the one or more servers (or other computing devices,) the instructions cause the one or more servers to perform operations of the process 1000.

At step 1002, the thermal modeling server receives updated system data. In some aspects, the updated system data can include updated temperature data measured inside the site. For example, the site can include a monitoring system including a control unit connected to a thermostat. In this instance, the monitoring system may collect temperature data in real-time or near real-time. The monitoring system may further be configured to provide the temperature data to the thermal modeling server at predetermined intervals in time. In other aspects, the thermal modeling server can be configured to provide a request to the monitoring system to transmit updated system data such as updated temperature data measured inside the site.

In some examples, the monitoring system may be configured to store the temperature data in a database. The thermal modeling server may access the temperature data via the database persistently, at predetermined intervals of time, upon request of the generation of a thermal model, and the like.

At step 1004, the thermal modeling server receives updated weather data. The updated weather data can include updated weather data descriptive of weather at the location of the site. For example, the weather data can correspond to outdoor temperature. The outdoor temperature can correspond to fluctuations of temperature external to the site. The weather data may be provided by a weather server to the thermal modeling server at predetermined intervals in time. In other aspects, the thermal modeling server can be configured to provide a request to the weather server to transmit updated weather data such as updated weather data measured external to the site.

At step 1006, the thermal modeling server aligns the updated system data with the updated weather data. The thermal modeling server can be configured to align the updated system data and the updated weather data over time intervals. The thermal modeling server can be configured to align the site data and the weather data over predetermined time intervals such as every minute, every four hours, every week, and the like. In an example, the thermal modeling server aligns system data such as updated temperature data with the updated weather data corresponding to the site.

At step 1008, the thermal modeling server analyzes the aligned updated data against previously aligned data and against the generated thermal models. The aligned updated data may be compared against the previously aligned data to determine if modeling parameters of the site should be updated. For example, the aligned updated data may be compared against the previously aligned data to determine that the internal heat gain, the thermal product, and/or the thermal potential of the site should be updated. In another example, the aligned updated data may be compared against the generated thermal models to determine if the thermal models need to be regenerated using the updated data.

In some aspects, the generated thermal models may be analyzed to determine whether or not to regenerate additional thermal models. The generated thermal models may be rejected based on a broad range of considerations such as statistical likelihood metrics and predictive accuracy. For example, the generated thermal models may be rejected based on a predictive accuracy that references performing cross-validation to separate model training from validation data, which enables low-variance assessment of predictive accuracy. In this instance, the rejection of the generated thermal models may cause new thermal models to be generated for the respective sites. The regenerated thermal models may or may not include the updated, aligned data.

At step 1010, the thermal modeling server updates the thermal model for the site. The thermal modeling server can be configured to update the thermal model for the site based on the analysis of the updated aligned data against the previously aligned data and the generated thermal model. The thermal modeling server can be configured to update the thermal model using the updated aligned data.

Figure 11:
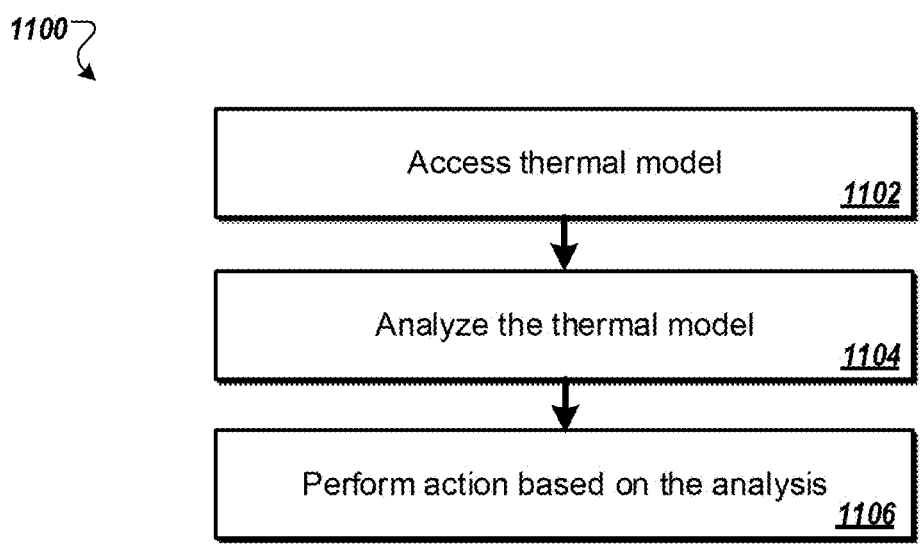
FIG. 11 is a flow chart illustrating an example process for performing actions based on an analysis of thermal models.

FIG. 11 is a flow chart illustrating an example process 1100 for performing actions based on an analysis of thermal models. The process 1100 can be performed by one or more servers or other computing devices. For example, operations of the process 1100 can be performed by server 114 of FIG. 1. Operations of the process 1100 can also be implemented as instructions stored on a non-transitory computer readable medium, and when the instructions are executed by the one or more servers (or other computing devices,) the instructions cause the one or more servers to perform operations of the process 1100.

At step 1102, the thermal modeling server accesses a generated thermal model for a particular site. The thermal modeling server may access one or more thermal models for the particular site. The thermal model may be accessed via a database that is connected to the thermal modeling server. The thermal model may be accessed by the thermal modeling server automatically at predetermined points in time. The thermal models may also be accessed by the thermal modeling server in response to receiving a request to access the thermal model.

At step 1104, the thermal modeling server analyzes the thermal model. The thermal modeling server can be configured to analyze the thermal model over a predetermined period of time to identify characteristics of the thermal model over varying internal and external conditions.

At step 1106, the thermal modeling server performs an action related to the site based on the analysis. The action can include one or more actions related to the site. The actions can correspond to an improvement in an energy efficiency of the site. In some examples, the action includes one or more of providing the generated thermal model as output to a graphical display, providing a recommendation of an adjustment to a schedule of the control unit, automatically adjusting the schedule of the control unit, providing a recommendation of an adjustment to the state of the heating or cooling system, providing a recommendation of an adjustment to a characteristic of the site, and providing runtime and cost forecasting for the heating or cooling system in light of forecasted weather and settings for the control unit.

Figure 12A:
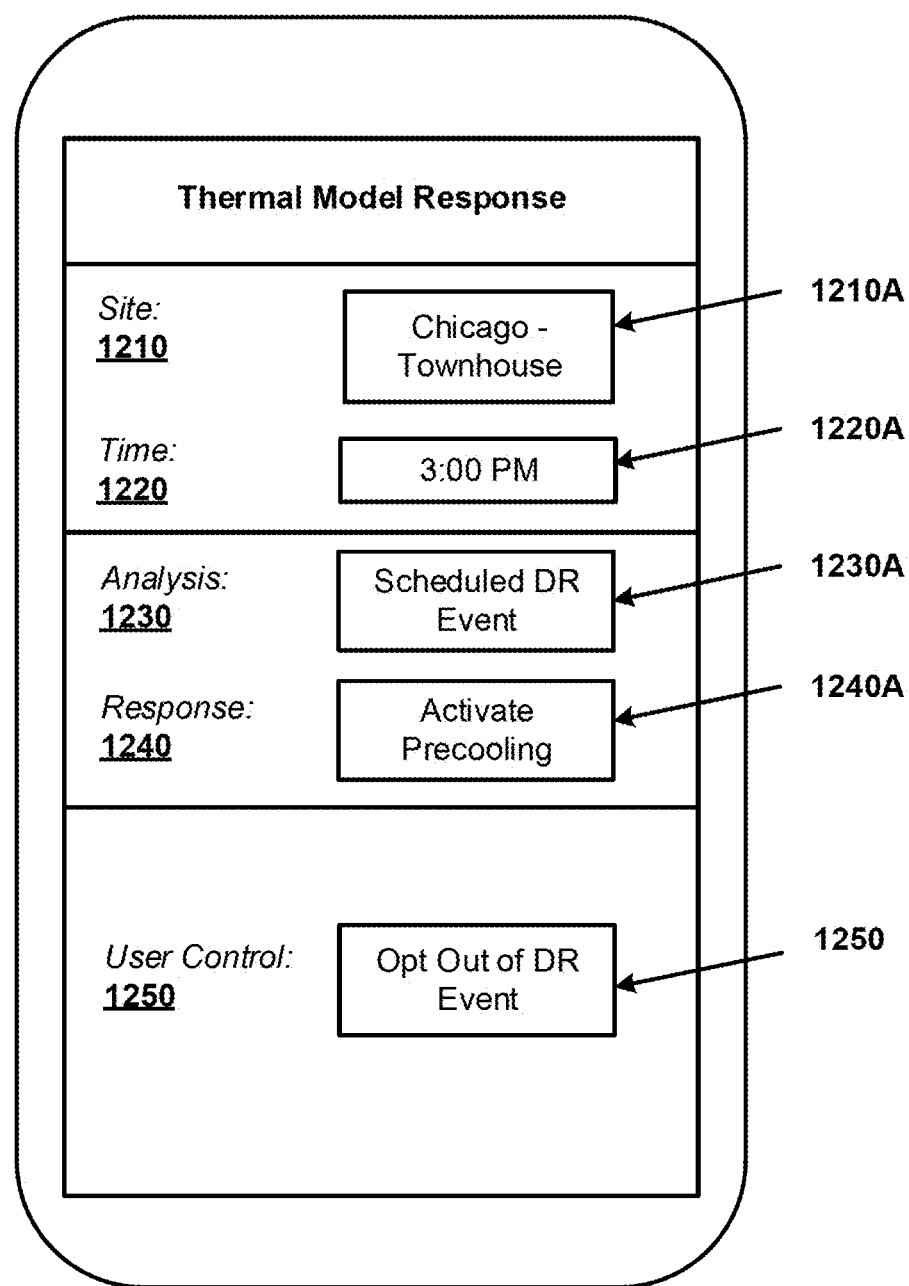
FIG. 12A-C are exemplary interfaces for thermal model responses.

FIG. 12A is an exemplary interface for a thermal model response. The interface of FIG. 12A includes a site field 1210 indicating a particular site and location of the site, a time field 1220 indicating a time of that the thermal model response is generated, an analysis field 1230 indicating a determined analysis based on a generated thermal model for the site, a response field 1240 indicating a response to the analysis, and user control 1250 including user provided options for the thermal model response.

The interface for a thermal model response provides a visual notification of a response to a generated thermal model. The interface can provide various information pertaining to the thermal model as well as various information regarding an analysis of the thermal model. The analysis of the thermal model can be performed to determine potential actions that may be performed based on the analysis. For example, a thermal modeling server may be configured to automatically generate a thermal model response upon the generation of a thermal model for a particular site. The thermal model response may be generated based on an analysis of the generated thermal model and provided to a computing device for display via an interface for a thermal model response.

Referring to FIG. 12A, the site field 1210 includes a location of a particular site and a type of the particular site. In this instance, the location and type of the particular site 1210A is Chicago—Townhouse. As such, the thermal model response corresponds to a thermal model that has been generated for the respective townhouse in Chicago, Ill. The time field 1220 indicates that the thermal model response is generated 1220A at 3:00 PM. The analysis field 1230 indicates that the thermal model has been analyzed and that the analysis 1230A includes a scheduled demand response event that the site is enrolled in. In this instance, the server may analyze the thermal model to determine that the particular site is to be included in a future demand response event. Using parameters and/or characteristics of the thermal model for the particular site, the server may further determine a response 1240 to the analysis 1230. In an example, the server may determine that precooling should be activated 1240A at the particular site in preparation for the scheduled demand response event.

The response 1240 can include a recommendation for the particular site that is based on the analysis 1230. For example, the server may determine that energy consumption would be minimized if the particular site activates precooling in anticipation of the future demand response event. As such, the thermal modeling server may determine to activate precooling at the site 30 minutes before the demand response event.

In some aspects, the thermal model response interface includes user control in which a user may respond to the thermal model response. In this instance, the user may decide to opt out 1250 of the scheduled demand response event 1230A. As such, the user provides control over the enrollment of the particular site in scheduled demand response events.

Figure 12B:
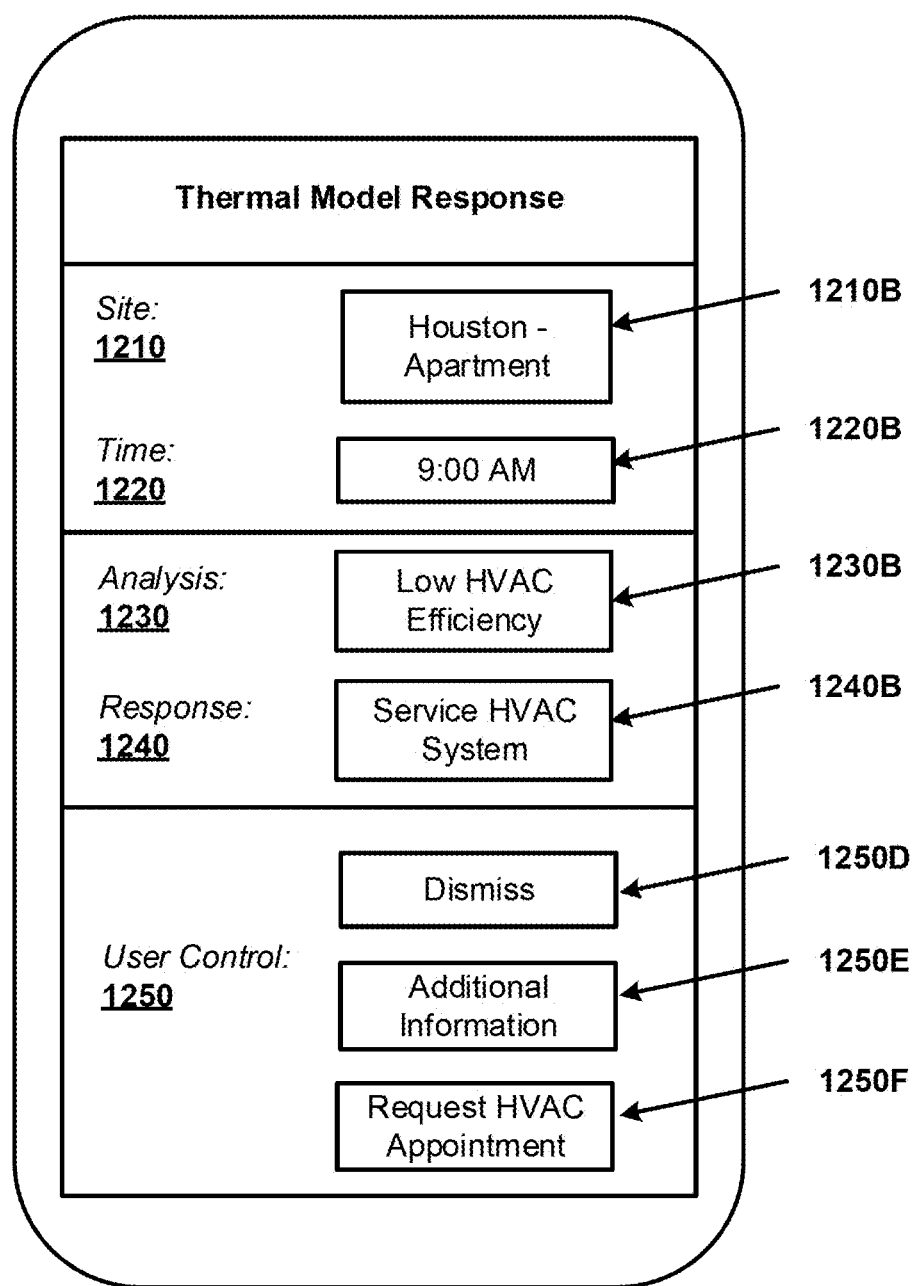

FIG. 12B is an exemplary interface for a thermal model response. The interface of FIG. 12B includes a site field 1210 indicating a particular site and location of the site, a time field 1220 indicating a time of that the thermal model response is generated, an analysis field 1230 indicating a determined analysis based on a generated thermal model for the site, a response field 1240 indicating a response to the analysis, and user control 1250 including user provided options for the thermal model response.

Referring to FIG. 12B, the site field 1210 includes a location of a particular site and a type of the particular site. In this instance, the location and type of the particular site 1210B is Houston—Apartment. As such, the thermal model response corresponds to a thermal model that has been generated for the respective apartment in Houston, Tex. The time field 1220 includes indicates that the thermal model response is generated 1220B at 9:00 AM. The analysis field 1230 indicates that the thermal model has been analyzed and that the analysis 1230B includes a low HVAC efficiency of the site. In this instance, the server may analyze the thermal model to determine that the particular site includes a low energy efficiency corresponding to an HVAC system at the site. Using parameters and/or characteristics of the thermal model for the particular site, the server may further determine a response 1240 to the analysis 1230. In an example, the server may determine that the HVAC system 1240B at the site should be serviced to increase the HVAC efficiency.

The response 1240 can include a recommendation for the particular site that is based on the analysis 1230. For example, the server may determine that energy consumption would be minimized if the HVAC system of the particular site was serviced. In some aspects, the thermal model response interface includes user control 1250 in which a user may respond to the thermal model response. In this instance, the user may decide to dismiss 1250D the response 1240, request additional information 1250E or request an HVAC appointment 1250F. Specifically, the user may request additional information 1250E regarding the low HVAC efficiency. In this instance, the server may provide further information regarding the analysis 1230 and the response 1240 that further clarifies why the HVAC system is recommended to be serviced 1240B. The user may request an HVAC appointment 1250F directly via the thermal model response interface. The HVAC appointment request 1250F may link the user to a website of an HVAC system supplier, automatically place a telephone call to an HVAC system supplier, automatically schedule a next available HVAC appointment, and the like. As such, the user provides control over actions to be performed at the particular site.

Figure 12C:
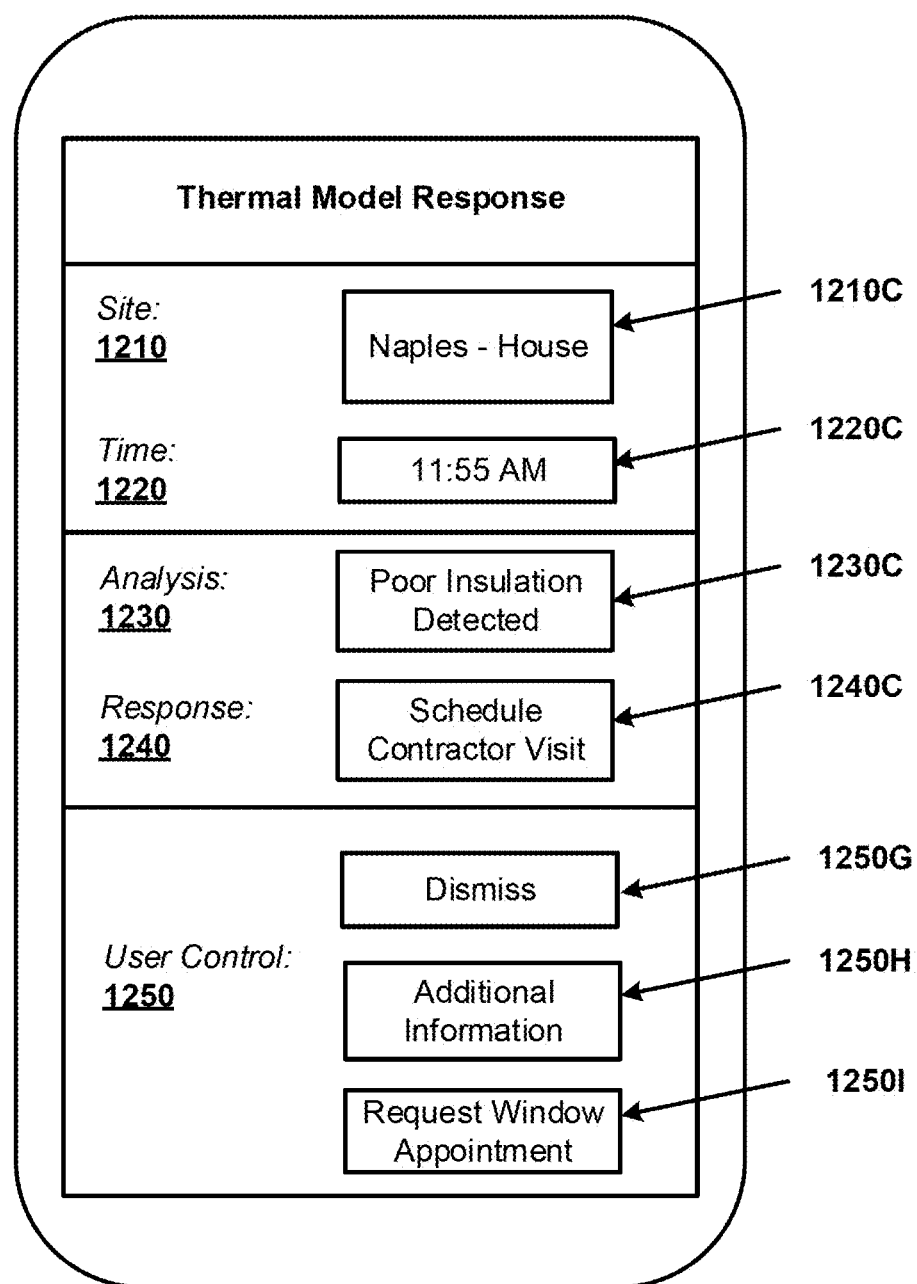

FIG. 12C is an exemplary interface for a thermal model response. The interface of FIG. 12C includes a site field 1210 indicating a particular site and location of the site, a time field 1220 indicating a time of that the thermal model response is generated, an analysis field 1230 indicating a determined analysis based on a generated thermal model for the site, a response field 1240 indicating a response to the analysis, and user control 1250 including user provided options for the thermal model response.

Referring to FIG. 12C, the site field 1210 includes a location of a particular site and a type of the particular site. In this instance, the location and type of the particular site 1210C is Naples—House. As such, the thermal model response corresponds to a thermal model that has been generated for the respective house in Naples, Fla. The time field 1220 includes indicates that the thermal model response is generated 1220C at 11:55 AM. The analysis field 1230 indicates that the thermal model has been analyzed and that the analysis 1230C includes a detection of poor insulation of the site. In this instance, the server may analyze the thermal model to determine that the particular site includes poor insulation resulting from a low thermal resistance and/or a low thermal capacitance of the particular site. Using parameters and/or characteristics of the thermal model for the particular site, the server may further determine a response 1240 to the analysis 1230. In an example, the server may determine that a contractor visit be scheduled 1240C to address the poor insulation of the site.

The response 1240 can include a recommendation for the particular site that is based on the analysis 1230. In another example, the server may determine that energy consumption would be minimized if the HVAC system of the particular site was replaced. In some aspects, the thermal model response interface includes user control 1250 in which a user may respond to the thermal model response. In this instance, the user may decide to dismiss 1250G the response 1240, request additional information 1250H or request a window appointment 1250I to replace windows of the site. Specifically, the user may request additional information 1250H regarding the poor insulation of the site. In this instance, the server may provide further information regarding the analysis 1230 and the response 1240. The further information may clarify the degree to which the current windows are negatively affecting the insulation as well as how the recommended contractor visit 1240C would positively impact the energy consumption of the site. The user may request a window appointment 1250I directly via the thermal model response interface. The window appointment request 1250I may link the user to a website of a window replacement service, automatically place a telephone call to a window replacement service, automatically schedule a next available window replacement appointment, and the like. As such, the user provides control over actions to be performed at the particular site.

Figure 13:
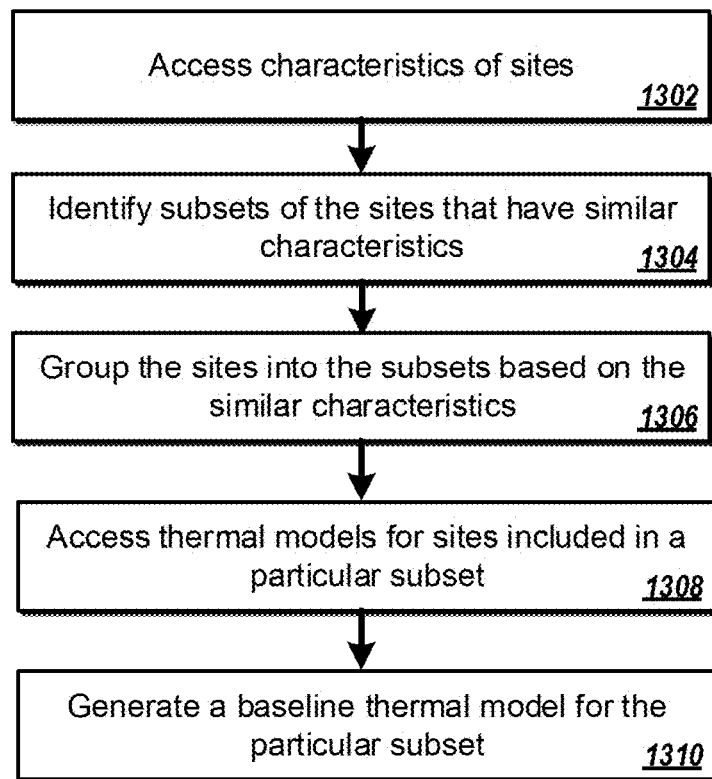
FIG. 13 is a flow chart illustrating an example process for generating a representative thermal model.

FIG. 13 is a flow chart illustrating an example process 1300 for generating a representative thermal model. The process 1300 can be performed by one or more servers or other computing devices. For example, operations of the process 1300 can be performed by server 114 of FIG. 1. Operations of the process 1300 can also be implemented as instructions stored on a non-transitory computer readable medium, and when the instructions are executed by the one or more servers (or other computing devices,) the instructions cause the one or more servers to perform operations of the process 1300.

At step 1302, the thermal modeling server accesses characteristics associated with each of multiple sites. In some aspects, the thermal modeling server may access the characteristics via a database that is connected to the thermal modeling server. The database may be used to store historical site data such as system data, weather data, modeling parameters, or any other characteristics of the sites. The database may be included in the thermal modeling server, or may be separate from and in communication with the thermal modeling server.

At step 1304, the thermal modeling server identifies one or more subsets of the multiple sites that have similar characteristics. The thermal modeling server can be configured to identify the one or more subsets based on the accessed characteristics. For example, the thermal modeling server may identify sites that have similar geographic locations, similar duty cycles, similar energy management program enrollment, similar indoor temperatures, similar external weather, a similar internal heat gain, a similar thermal product, a similar thermal potential, and the like.

At step 1306, the thermal modeling server groups the multiple sites into the one or more subsets that have similar characteristics. The thermal modeling server can be configured to group each of the sites into a single subset. In other aspects, the thermal modeling server can be configured to group each of the sties into a plurality of different subsets. For example, a particular site may include an average internal heat gain of 15 degrees Fahrenheit during the month of June. In this instance, the particular site may be grouped into a first subset with other sites that include the characteristic of an average internal heat gain within 2 degrees of 15 degrees Fahrenheit during the month of June (an average internal heat gain during the month of June between the range of 13 degrees Fahrenheit and 17 degrees Fahrenheit). Additionally, the particular site may include a thermal potential of 30 degrees Fahrenheit. In this instance, the particular site may also be grouped into a second subset with other sites that include the characteristic of an average thermal potential within 2 degrees of 30 degrees Fahrenheit (an average thermal potential between the range of 32 degrees Fahrenheit and 28 degrees Fahrenheit). Thus, the thermal modeling server may be configured to group each site into a single or multiple different subsets of sites based on similar characteristics.

At step 1308, the thermal modeling server accesses thermal models corresponding to sites grouped in a particular subset of the one or more subsets. The thermal modeling server may be configured to access a single thermal model for each of the sites in the particular subset. The thermal model can correspond to the most recently generated thermal model for each of the sites in the particular subset. In another example, the thermal modeling server can be configured to access multiple thermal models for each of the sites in the particular subset. The thermal models may be aggregated for the group of sites in the particular subset by the thermal modeling server.

At step 1310, the thermal modeling server generates a representative thermal model for the particular subset. The representative thermal model can be generated based on the accessed thermal models by the thermal modeling server. The representative thermal model can be associated with the particular subset. In some aspects, the representative thermal model may be used for each of the sites of the particular subset when the sites of the subset are simulated under various internal and external conditions.

Figure 14:
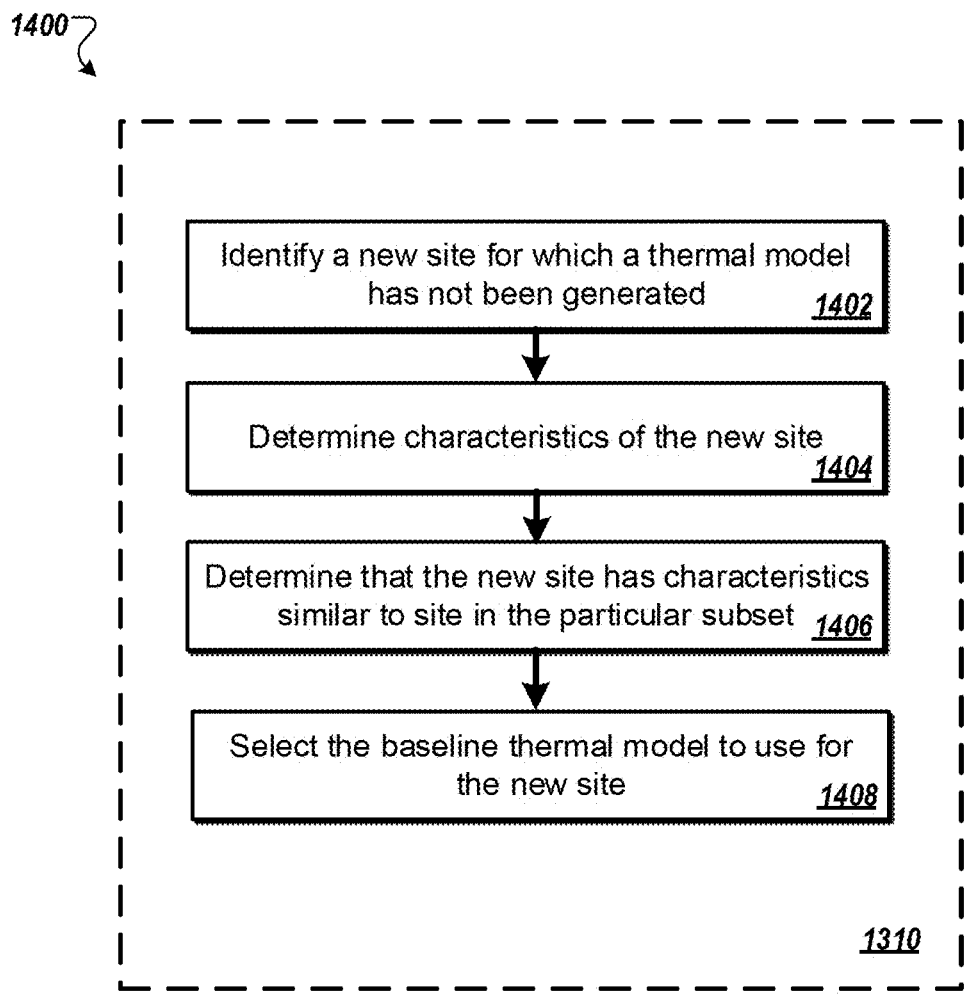
FIG. 14 is a flow chart illustrating an example process for selecting a thermal model for a new site.

FIG. 14 is a flow chart illustrating an example process 1400 for selecting a thermal model for a new site. The process 1400 can include a subprocess for step 1310 of FIG. 13. The process 1400 can be performed by one or more servers or other computing devices. For example, operations of the process 1400 can be performed by server 114 of FIG. 1. Operations of the process 1400 can also be implemented as instructions stored on a non-transitory computer readable medium, and when the instructions are executed by the one or more servers (or other computing devices,) the instructions cause the one or more servers to perform operations of the process 1400.

At step 1402, the thermal modeling server identifies a new site for which a thermal model has not been generated. The new site can include a site that is associated with a monitoring system that includes a control unit configured to control a heating or cooling system located at the site.

At step 1404, the thermal modeling server determines characteristics associated with the new site. The thermal modeling server can be configured to determine the characteristics associated with the new site in response to identifying the new site for which a thermal model has not been identified. The characteristics associated with the new site can include monitoring data, internal temperature data, system data associated with the new site, weather data based on weather proximate to the new site, an internal heat gain of the new site, a thermal potential of the new site, a thermal product of the new site, geographical location, membership of the site resident in an energy management program, and the like.

At step 1406, the thermal modeling server determines that the new site has characteristics similar to sites in the particular subset. The characteristics of the new site may be compared against the identified similar characteristics of the subsets by the thermal modeling server. For example, the thermal modeling server can be configured to compare the determined characteristics of the new site with the accessed characteristics. The comparison may be used to determine whether the determined characteristics of the new site satisfy a characteristics threshold. The characteristics threshold may be used to indicate when the new site is similar to a preexisting subset of sites. As such, the new site may be determined to include a number of characteristics that are similar to a predetermined subset of the one or more subset of the multiple sites.

At step 1408, the thermal modeling server selects the representative thermal model to use for the new site, or a combination of representative models to be combined. The thermal modeling server can be configured to select the representative thermal model to use for the new site based on the determination that the new site has characteristics similar to sites in the particular subset. For example, the particular subset may include characteristics that are most similar to the identified characteristics of the new site. In this instance, the particular subset may include more similar characteristics to the characteristics of the new site than another subset of the one or more subsets.

Figure 15:
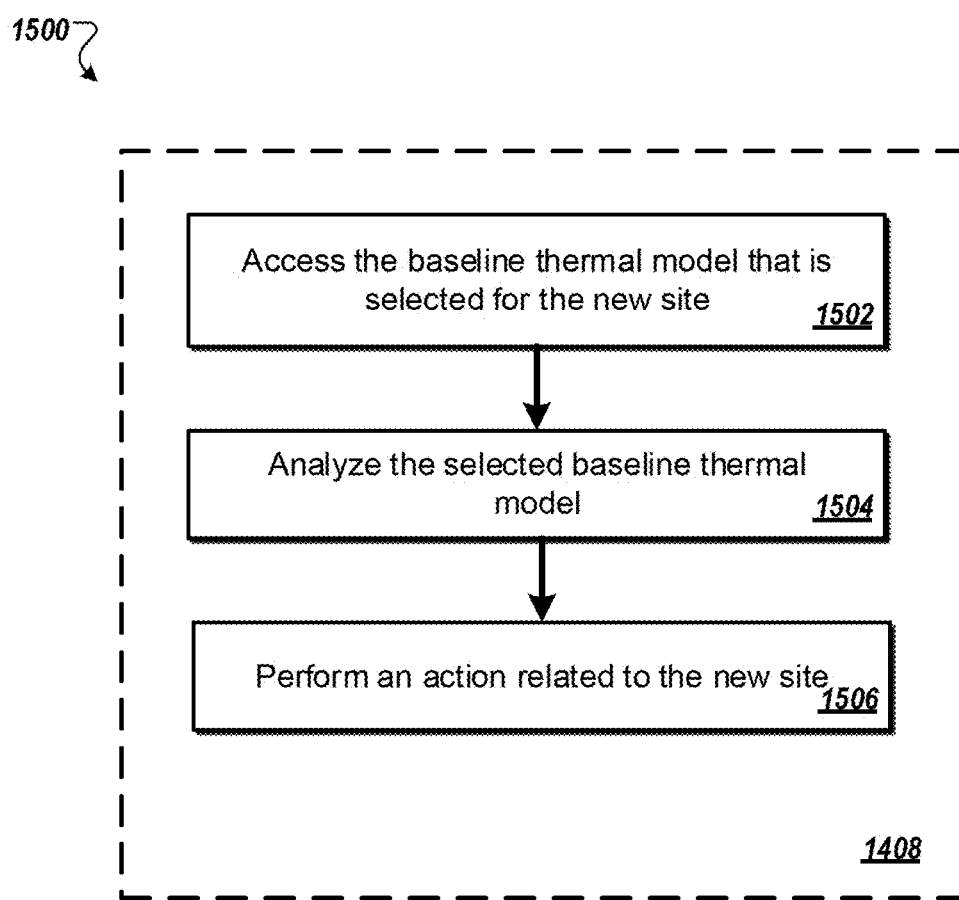
FIG. 15 is a flow chart illustrating an example process for performing an action related to a new site.

FIG. 15 is a flow chart illustrating an example process 1500 for performing an action related to a new site. The process 1500 can include a subprocess for step 1408 of FIG. 14. The process 1500 can be performed by one or more servers or other computing devices. For example, operations of the process 1500 can be performed by server 114 of FIG. 1. Operations of the process 1500 can also be implemented as instructions stored on a non-transitory computer readable medium, and when the instructions are executed by the one or more servers (or other computing devices,) the instructions cause the one or more servers to perform operations of the process 1500.

At step 1502, the thermal modeling server accesses the representative thermal model that is selected for the new site. The representative thermal model may be accessed via a database that is connected to the thermal modeling server. The database may be used to store thermal models for multiple sites including the new site.

At step 1504, the thermal modeling server analyzes the representative thermal model that has been selected for the new site. The thermal modeling server may analyze the representative thermal model over time. For example, the thermal modeling server may analyze the representative thermal model under various internal and external conditions over the span of an hour, a day, a week, and the like.

At step 1506, the thermal modeling server performs an action related to the new site. The thermal modeling server can be configured to perform the action based on the analysis of the representative thermal model. The action can include one or more actions related to the new site. The actions can correspond to an improvement in an energy efficiency of the new site. In some examples, the action includes one or more of providing the representative thermal model as output to a graphical display, providing a recommendation of an adjustment to a schedule of a control unit of the new site, automatically adjusting the schedule of the control unit, providing a recommendation of an adjustment to the state of a heating or cooling system of the new site, providing a recommendation of an adjustment to a characteristic of the new site, and providing runtime and cost forecasting for the heating or cooling system in light of forecasted weather and settings for the control unit.

Figure 16:
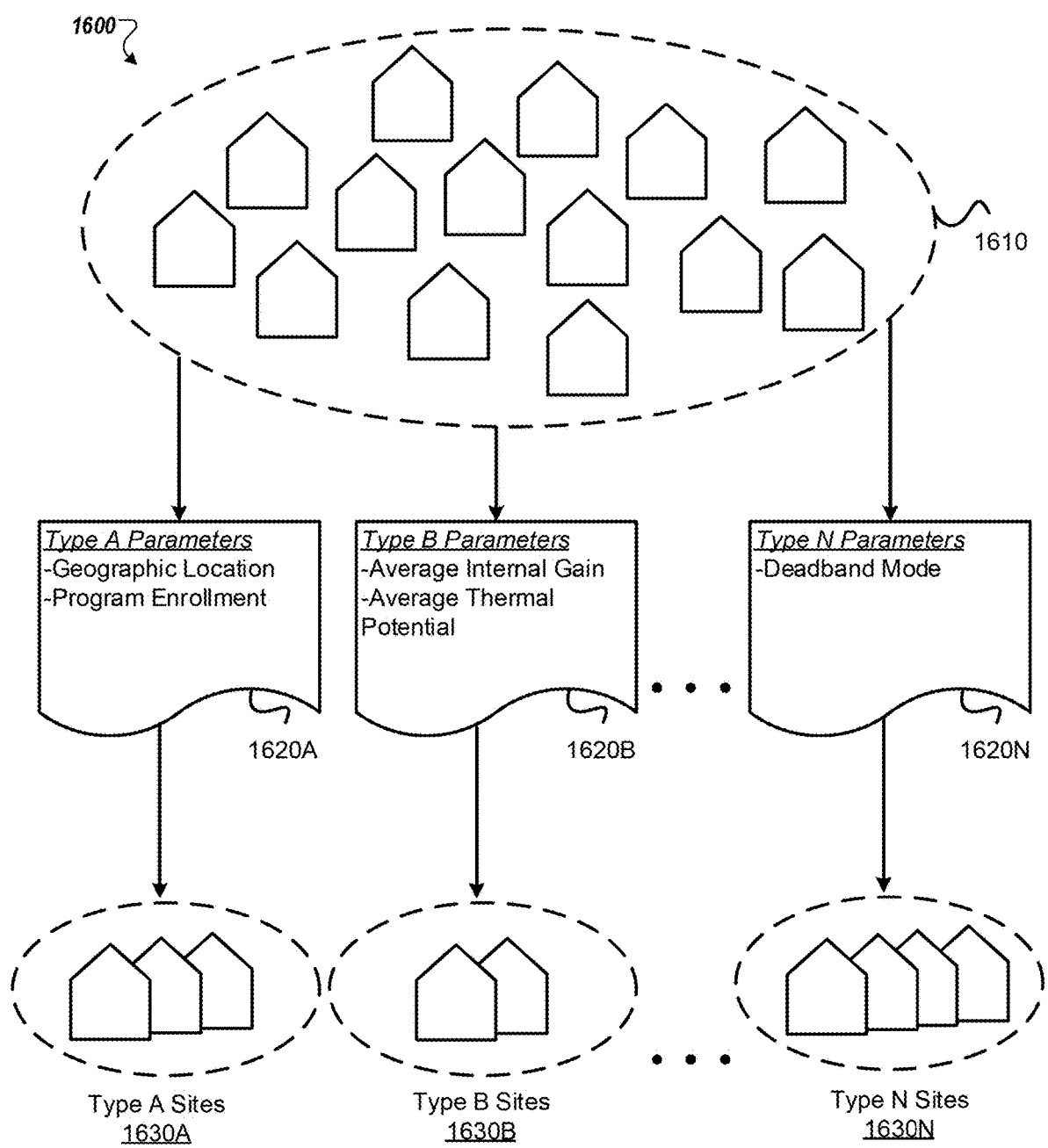
FIG. 16 is an exemplary diagram illustrating thermal model clustering.

FIG. 16 is an exemplary diagram of thermal model clustering 1600. The thermal model clustering 1600 includes a population 1610 of sites associated with thermal models, thermal model type parameters 1620A-N, and types 1630A-N of sites associated with thermal models. The thermal model clustering 1600 may be used to classify sites and/or thermal models associated with the sites by various parameters such as program participation, modeling parameters, averages of modeling parameters, means of modeling parameters, modes of modeling parameters, and the like.

The population 1610 of sites associated with the thermal models includes a plurality of sites. The plurality of sites can include sites located in various geographic locations, sites enrolled in various different energy management programs, site with varying heat flow characteristics, and the like. In some aspects, each of the sites in the population 1610 is associated with a thermal model. In other aspects, each of the sites is associated with multiple thermal models. Each of the sites in the population 1610 may be identified by a corresponding thermal model, internal heat gain, thermal product, thermal potential, deadband, and the like. The data of the population 1610 may be stored by a thermal modeling server in a database. The thermal modeling server may be a database server. In this instance, the data of the population 1610 may be stored locally at the thermal modeling server. Otherwise, the data of the population 1610 may be stored remotely at another database.

The data of the population 1610 may be accessed by the thermal modeling server, or any other remote server. The accessed data can be used to determine thermal model type parameters 1620A-N. The thermal model type parameters 1620A-N can each correspond to a particular set of parameters of the thermal models. The thermal model type parameters 1620A-N may be used to organize the thermal models of the population 1610 by similar parameters.

Referring to FIG. 16, Type A Parameters 1620A include parameters of a particular geographic location and particular program enrollment. In this instance, Type A Parameters 1620A are used to filter thermal models associated with sites of the population 1610 based on a particular geographic location and energy management program enrollment. For example, the Type A Parameters 1620A may be used by the thermal modeling server to characterize a cluster of Type A Sites 1630A that are located in Washington, D.C. and are enrolled in a particular load control program that provides control strategies that intend to manage energy consumption of the sites.

Referring again to FIG. 16, Type B Parameters 1620B include parameters of a particular average internal gain and average thermal potential. In this instance, Type B Parameters 1620B are used to filter thermal models associated with the sites of the population 1610 based on a predefined average internal heat gain and average thermal potential. For example, the Type B Parameters 1620B may be used by the thermal modeling server to characterize a cluster of Type B Sites 1630B that include an internal heat gain within a 3 degrees Fahrenheit range of a predetermined internal heat gain of 5 degrees Fahrenheit during the month of August, and include a thermal potential within 5 degrees Fahrenheit of a predetermined thermal potential of 30 degrees Fahrenheit.

Referring again to FIG. 16, Type N Parameters 1620N includes a particular deadband mode parameter. In this instance, Type C Parameters 1620N are used to filter thermal models associated with the sites of the population 1610 based on a deadband mode. The deadband mode may be determined using the data associated with the population 1610. For example, the Type C Parameters 1620N may be used by the thermal modeling server to characterize a cluster of Type C Sites 1630N that include the most frequently occurring deadband of the population 1610, such as a deadband that ranges 0.5 degrees Fahrenheit above and 0.5 degrees Fahrenheit below internal setpoint temperatures of the population 1610.

In certain aspects, the thermal modeling server may generate a representative thermal model for each of the types of sites 1630A-N. As such, the cluster of Type A Sites 1630A may be associated with a first representative thermal model, the cluster of Type B Sites 1630B may be associated with a second representative thermal model, and the like. The representative thermal models may be determined using the parameters of the thermal model type parameters 1620A-N. For example, the representative thermal model associated with the cluster of Type B Sites 1630B may be generated using the corresponding average internal heat gain and average thermal potential included in the Type B Parameters 1620B.

In some aspects, the generated representative thermal models may be associated with new sites that are added to the population 1610. For example, a site may be added to the population 1610 that is not associated with a thermal model. The new site may be characterized according to various parameters and then associated with one or more of the representative thermal models using the various clusters of types of thermal models 1630A-N.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method, comprising
accessing characteristics associated with each of multiple physical sites;
identifying, based on the accessed characteristics, subsets of the multiple physical sites that have similar characteristics;
grouping the multiple physical sites into the subsets of the multiple physical sites that have similar characteristics;
accessing, from models for a particular subset of the subsets that includes one or more first sites and one or more second sites, one or more thermal models for the one or more first sites, the one or more second sites not having thermal models;
generating, based on the accessed thermal models, a representative thermal model for the particular subset of the subsets; and
predicting, using the representative thermal model, a likely energy consumption for a site from the one or more second sites by performing simulations for the site under a control strategy to meet a demand response event.

2. The computer-implemented method of claim 1, further comprising:
identifying a new site for which a site-specific thermal model is unavailable;
in response to identifying the new site for which a site-specific thermal model is unavailable, determining characteristics associated with the new site;
determining, based on the determined characteristics of the new site, that the new site has characteristics similar to sites in the particular subset; and
selecting, based on the determination that the new site has characteristics similar to sites in the particular subset, the representative thermal model to use for the new site.

3. The computer-implemented method of claim 2, further comprising:
analyzing the representative thermal model that has been selected for the new site; and
performing, based on the analysis of the representative thermal model, an action related to the new site.

4. The computer-implemented method of claim 1, wherein accessing characteristics associated with each of multiple physical sites comprises accessing historical site data including system data, weather data, and modeling parameters.

5. The computer-implemented method of claim 1, wherein identifying subsets of the multiple physical sites that have similar characteristics comprises identifying sites that have at least one of similar geographic locations, similar duty cycles, similar energy management program enrollment, similar indoor temperatures, similar external weather, a similar internal heat gain, a similar thermal product, or a similar thermal potential.

6. The computer-implemented method of claim 1, wherein grouping the multiple physical sites into the subsets of the multiple physical sites that have similar characteristics comprises:
determining an average internal heat gain for a particular site; and
grouping the particular site into a first subset with other sites that have an average internal heat gain within a threshold of the determined average internal heat gain for the particular site.

7. The computer-implemented method of claim 1, wherein grouping the multiple physical sites into the subsets of the multiple physical sites that have similar characteristics comprises:
determining a thermal potential for a particular site; and
grouping the particular site into a first subset with other sites that have a thermal potential within a threshold of the determined thermal potential for the particular site.

8. The computer-implemented method of claim 1, wherein using the representative thermal model for at least one site within the particular subset for which a site-specific thermal model is unavailable comprises using the representative thermal model for each of the sites of the particular subset during simulations under various internal and external conditions.

9. The computer-implemented method of claim 1, wherein using the representative thermal model for at least one site within the particular subset for which a site-specific thermal model is unavailable comprises automatically adjusting a schedule of a control unit for the at least one site within the particular subset based on the representative thermal model.

10. The computer-implemented method of claim 1, wherein using the representative thermal model for at least one site within the particular subset for which a site-specific thermal model is unavailable comprises providing, based on the representative thermal model, runtime and cost forecasting for a heating or cooling system of each of the at least one site within the particular subset in light of forecasted weather and control settings.

11. The computer-implemented method of claim 1, further comprising:
in response to performing the simulations for each site in the particular subset of the subsets, determining an optimal control strategy of energy consumption across the sites during the demand response event in which the sites are currently enrolled, wherein the optimal control strategy includes multiple control strategy parameters for configuring each site to provide a desired amount of load reduction across the sites during the demand response event.

12. The computer-implemented method of claim 1, further comprising:
in response to determining that the likely energy consumption for the site satisfies a consumption threshold, sending, to the site and using the control strategy, an instruction to cause the site to adjust energy consumption according to the control strategy.

13. A thermal modeling server, comprising:
one or more computers in communication with monitoring systems located at multiple sites; and
one or more storage devices storing instructions that are operable, when executed by the one or more computers, to cause the one or more computers to perform operations comprising:
accessing characteristics associated with each of multiple physical sites;

identifying, based on the accessed characteristics, subsets of the multiple physical sites that have similar characteristics;

grouping the multiple physical sites into the subsets of the multiple physical sites that have similar characteristics;

accessing, from models for a particular subset of the subsets that includes one or more first sites and one or more second sites, one or more thermal models for the one or more first sites, the one or more second sites not having thermal models;

generating, based on the accessed thermal models, a representative thermal model for the particular subset of the subsets; and predicting, using the representative thermal model, a likely energy consumption for a site from the one or more second sites by performing simulations for the site under a control strategy to meet a demand response event.

14. The thermal modeling server of claim 13, wherein the operations further comprise:

identifying a new site for which a site-specific thermal model is unavailable;

in response to identifying the new site for which a site-specific thermal model is unavailable, determining characteristics associated with the new site;

determining, based on the determined characteristics of the new site, that the new site has characteristics similar to sites in the particular subset; and selecting, based on the determination that the new site has characteristics similar to sites in the particular subset, the representative thermal model to use for the new site.

15. The thermal modeling server of claim 14, wherein the operations further comprise:

analyzing the representative thermal model that has been selected for the new site; and performing, based on the analysis of the representative thermal model, an action related to the new site.

16. The thermal modeling server of claim 13, wherein accessing characteristics associated with each of multiple physical sites comprises accessing historical site data including system data, weather data, and modeling parameters.

17. The thermal modeling server of claim 13, wherein identifying subsets of the multiple physical sites that have similar characteristics comprises identifying sites that have at least one of similar geographic locations, similar duty cycles, similar energy management program enrollment, similar indoor temperatures, similar external weather, a similar internal heat gain, a similar thermal product, or a similar thermal potential.

18. The thermal modeling server of claim 13, wherein grouping the multiple physical sites into the subsets of the multiple physical sites that have similar characteristics comprises:

determining an average internal heat gain for a particular site; and grouping the particular site into a first subset with other sites that have an average internal heat gain within a threshold of the determined average internal heat gain for the particular site.

19. The thermal modeling server of claim 13, wherein grouping the multiple physical sites into the subsets of the multiple physical sites that have similar characteristics comprises:

determining a thermal potential for a particular site; and grouping the particular site into a first subset with other sites that have a thermal potential within a threshold of the determined thermal potential for the particular site.

20. The thermal modeling server of claim 13, wherein using the representative thermal model for at least one site within the particular subset for which a site-specific thermal model is unavailable comprises using the representative thermal model for each of the sites of the particular subset during simulations under various internal and external conditions.

21. The thermal modeling server of claim 13, wherein using the representative thermal model for at least one site within the particular subset for which a site-specific thermal model is unavailable comprises automatically adjusting a schedule of a control unit for the at least one site within the particular subset based on the representative thermal model.

22. The thermal modeling server of claim 13, wherein using the representative thermal model for at least one site within the particular subset for which a site-specific thermal model is unavailable comprises providing, based on the representative thermal model, runtime and cost forecasting for a heating or cooling system of each of the at least one site within the particular subset in light of forecasted weather and control settings.

23. The computer-implemented method of claim 11, wherein the multiple control strategy parameters comprises at least one of internal heat gain, thermal product, and thermal potential.

\* \* \* \* \*